(12) United States Patent
Vermani et al.

(10) Patent No.: US 11,362,708 B2
(45) Date of Patent: Jun. 14, 2022

(54) GAIN NORMALIZATION FOR A JOINT TRANSMISSION

(71) Applicant: QUALCOMM Incorporated, San Diego, CA (US)

(72) Inventors: Sameer Vermani, San Diego, CA (US); Bin Tian, San Diego, CA (US); Stephen Jay Shellhammer, Ramona, CA (US); Youhan Kim, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 17/013,507

(22) Filed: Sep. 4, 2020

(65) Prior Publication Data

US 2021/0067214 A1    Mar. 4, 2021

Related U.S. Application Data

(60) Provisional application No. 62/895,979, filed on Sep. 4, 2019.

(51) Int. Cl.
*H04B 7/0456* (2017.01)
*H04W 52/24* (2009.01)
(Continued)

(52) U.S. Cl.
CPC ......... *H04B 7/0465* (2013.01); *H04B 7/0613* (2013.01); *H04B 7/0617* (2013.01);
(Continued)

(58) Field of Classification Search
CPC .......... H04B 1/38; H04B 1/40; H04B 7/0417; H04B 7/043; H04B 7/0434; H04B 7/0452; H04B 7/0465; H04B 7/061; H04B 7/0613; H04B 7/0617; H04B 7/0619; H04B 7/084; H04W 25/24; H04W 25/325
(Continued)

(56) References Cited

U.S. PATENT DOCUMENTS

2012/0258761 A1* 10/2012 Chuang .................... H04B 3/54
                                                         455/522
2014/0192734 A1*  7/2014 Ng ........................ H04L 5/0035
                                                         370/329
(Continued)

*Primary Examiner* — Young T. Tse
(74) *Attorney, Agent, or Firm* — DeLizio Law, PLLC

(57) ABSTRACT

This disclosure provides methods, devices and systems for wireless communication, and particularly, methods, devices and systems for implementing a joint transmission feature in a wireless communication system. Using the joint transmission feature, multiple access points (APs) may use an aggregated collection of antennas of multiple APs to simultaneously transmit a joint beamformed transmission to one or more stations (STAs). The techniques in this disclosure may prevent or reduce variations in relative gain adjustments by the APs that could otherwise negatively impact the joint transmission. In some implementations, a network device may determine a normalized gain adjustment value based on power parameters associated with each of the multiple APs. In some other implementations, each AP may determine the normalized gain adjustment value based on power parameters shared between the APs.

30 Claims, 14 Drawing Sheets

(51) Int. Cl.
*H04W 52/32* (2009.01)
*H04B 7/08* (2006.01)
*H04B 7/06* (2006.01)

(52) U.S. Cl.
CPC ............ *H04B 7/084* (2013.01); *H04W 52/24* (2013.01); *H04W 52/325* (2013.01)

(58) Field of Classification Search
USPC ....... 375/219, 220, 222, 259, 260, 262, 265, 375/267; 370/328, 330, 334, 343, 345, 370/349; 455/500, 517, 69, 88, 561, 455/90.1, 90.3
See application file for complete search history.

(56) References Cited

U.S. PATENT DOCUMENTS

| | | | |
|---|---|---|---|
| 2014/0294111 A1* | 10/2014 | Zhang | H04W 52/325 375/267 |
| 2015/0295629 A1* | 10/2015 | Xia | H04B 7/0695 370/329 |
| 2016/0323887 A1* | 11/2016 | Patel | H04W 52/365 |
| 2020/0022097 A1* | 1/2020 | Wang | H04W 52/146 |
| 2020/0112350 A1* | 4/2020 | Yang | H04B 7/088 |
| 2020/0137704 A1* | 4/2020 | Vermani | H04L 5/0053 |
| 2021/0307099 A1* | 9/2021 | Ryu | H04W 76/11 |

* cited by examiner

GAIN NORMALIZATION FOR A JOINT TRANSMISSION

CROSS-REFERENCE TO RELATED APPLICATIONS

This patent application claims priority to U.S. Provisional Patent Application No. 62/895,979 filed Sep. 4, 2019, entitled "GAIN NORMALIZATION FOR JOINT TRANSMISSIONS," and assigned to the assignee hereof. The disclosure of the prior application is considered part of and is incorporated by reference in this patent application.

TECHNICAL FIELD

This disclosure relates generally to wireless communication, and more specifically, to joint transmission by multiple access points.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN. New WLAN communication features are being developed to support greater throughput and reliability. For example, a WLAN communication system may include multiple APs configured to coordinate the transmission of beamformed messages to a single STA.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method may be performed by a network device such as a central controller or a master access point (AP). The method may include determining a plurality of APs to participate in a joint transmission of data to at least one station (STA). The method may include determining a plurality of sounding power levels for a plurality of sounding procedures between the plurality of APs and the at least one STA. Each of the sounding power levels may be determined for a respective one of the APs for a respective one of the sounding procedures with the at least one STA. The method may include determining a normalized gain adjustment value based on the plurality of sounding power levels, the normalized gain adjustment value for the plurality of APs to uniformly apply to their respective per-antenna transmission power levels. The method may include causing the plurality of APs to transmit the joint transmission to the at least one STA based on the normalized gain adjustment value.

In some implementations, the method may include transmitting the normalized gain adjustment value to the plurality of APs.

In some implementations, the method may include obtaining the data for the joint transmission. For example, the data may be obtained from one of the APs or from a backhaul network. The method may include determining a plurality of antennas to participate in the joint transmission. The plurality of antennas may include one or more antennas of each AP of the plurality of APs. The method may include obtaining sounding feedback from the plurality of APs for the plurality of antennas based on the plurality of sounding procedures. The method may include precoding the data for simultaneous transmission to the at least one STA by the plurality of antennas based on the sounding feedback.

In some implementations, precoding the data includes determining beamforming information for the plurality of antennas based on the sounding feedback.

In some implementations, determining the normalized gain adjustment value includes determining a plurality of individual gain adjustment values. Each individual gain adjustment value may be associated with a respective AP of the plurality of APs. The method may include determining the normalized gain adjustment value based on the plurality of individual gain adjustment values. In some implementations, the normalized gain adjustment value may be a greatest individual gain adjustment value of the plurality of individual gain adjustment values.

In some implementations, the method may include determining the plurality of individual gain adjustment values may include determining a plurality of overshoot power levels for the plurality of APs. Each of the overshoot power levels may represent an amount of power for the joint transmission above the respective sounding power level for the respective AP. The method may include determining a plurality of backoff power values for the plurality of APs, respectively. The method may include subtracting the plurality of backoff power values from the plurality of overshoot power levels, respectively. In some implementations, each of the individual gain adjustment values is based on the subtraction.

In some implementations, the method may include receiving the plurality of backoff power values from the plurality of APs, respectively. Each of the backoff power values may represent a difference between the respective sounding power level and a power limit for the respective AP.

In some implementations, the method may include determining a plurality of antennas to participate in the joint transmission, the plurality of antennas including one or more antennas of each AP of the plurality of APs. The method may include determining a plurality of per-antenna power limits based on the plurality of sounding power levels and the plurality of backoff power values, each per-antenna power limit being associated with a respective antenna of the plurality of antennas. The method may include determining the normalized gain adjustment value based on the plurality of per-antenna power limits.

In some implementations, the network device is or includes a first AP of the plurality of APs. Causing the plurality of APs to transmit the joint transmission may include transmitting the data to a central controller or other APs of the plurality of APs.

In some implementations, causing the plurality of APs to transmit the joint transmission to the at least one STA based on the normalized gain adjustment value includes determining a plurality of antennas to participate in the joint transmission, the plurality of antennas including one or more antennas of each AP of the plurality of APs. The method may include obtaining sounding feedback from the plurality of APs for the plurality of antennas based on the plurality of sounding procedures. The method may include determining beamforming information based on the sounding feedback. The method may include transmitting the data and the beamforming information to the first AP. The method may include causing the first AP to precode the data for simultaneous transmission to the at least one STA based on the beamforming information and the normalized gain adjustment value.

Another innovative aspect of the subject matter described in this disclosure can be implemented in a method for wireless communication by a first AP. The method may include receiving data from a network device for a joint transmission by a plurality of APs to at least a first station (STA), the plurality of APs including at least the first AP and a second AP. The method may include determining a normalized gain adjustment value. The normalized gain adjustment value may be based on a plurality of sounding power levels for a plurality of sounding procedures between the plurality of APs and the at least one STA. Each of the sounding power levels may be determined for a respective one of the APs for a respective one of the sounding procedures with the at least one STA. The method may include adjusting per-antenna transmission power levels of the first AP based on the normalized gain adjustment value. The normalized gain adjustment value maybe uniformly applied by the plurality of APs to their respective per-antenna transmission power levels. The method may include transmitting at least a portion of the joint transmission to the at least one STA based on the adjusted per-antenna transmission power level.

In some implementations, determining the normalized gain adjustment value includes receiving the normalized gain adjustment value from the network device.

In some implementations, determining the normalized gain adjustment value includes receiving one or more sounding power levels associated with one or more other APs of the plurality of APs and determining the normalized gain adjustment value based on a first sounding power level of the first AP and the one or more sounding power levels.

In some implementations, determining the data for the joint transmission includes receiving the data in a form of a precoded joint transmission having been precoded by the network device.

In some implementations, the method may include determining a sounding power level for the first AP based on a backoff power value subtracted from a power limit of the first AP. The method may include transmitting one or more sounding transmissions having the sounding power level from the antennas of the first AP. The method may include receiving sounding feedback from the at least one STA in response to the one or more sounding transmissions. The method may include transmitting the sounding feedback or beamforming information based on the sounding feedback to the network device.

In some implementations, the method may include determining the backoff power value to subtract from the power limit such that the adjusted transmission power level will be less than a threshold value.

In some implementations, the method may include transmitting the backoff power value to the network device. The normalized gain adjustment value may be based on a plurality of backoff power values corresponding to the plurality of APs.

In some implementations, the method may include receiving beamforming information from the network device, a central controller or a second AP, the beamforming information based on sounding feedback for the plurality of sounding procedures. The method may include precoding the data for simultaneous transmission to the at least one STA based on the beamforming information and the normalized gain adjustment value.

In some implementations, the method may include determining a plurality of antenna gain adjustment values, each antenna gain adjustment value based on a power limit associated with a respective antenna of the first AP and the sounding power level for the first AP. The method may include determining a first AP gain adjustment value based on the plurality of antenna gain adjustment values. The first AP gain adjustment value may be a greatest antenna gain adjustment value of the plurality of antenna gain adjustment values.

In some implementations, the method may include transmitting the first AP gain adjustment value to the network device. The method may include receiving the normalized gain adjustment value from the network device. The normalized gain adjustment value may be based on a plurality of AP gain adjustment values corresponding to the plurality of APs.

In some implementations, the method may include receiving at least a second AP gain adjustment value from the second AP. The method may include determining the normalized gain adjustment value based on the first AP gain adjustment value and the second AP gain adjustment value. The normalized gain adjustment value may represent a greatest AP gain adjustment value of AP gain adjustment values received from the plurality of APs.

Another innovative aspect of the subject matter described in this disclosure can be implemented in a wireless communication device for managing a joint transmission from a plurality of access points (APs). The wireless communication device may include at least one modem, at least one processor communicatively coupled with the at least one modem, and at least one memory communicatively coupled with the at least one processor and storing processor-readable code. The processor-readable code, when executed by the at least one processor in conjunction with the at least one modem, may be configured to determine the plurality of APs to participate in a joint transmission of data to at least one station (STA), determine a plurality of sounding power levels for a plurality of sounding procedures between the plurality of APs and the at least one STA, each of the sounding power levels being determined for a respective one of the APs for a respective one of the sounding procedures with the at least one STA and determine a normalized gain adjustment value based on the plurality of sounding power levels. The normalized gain adjustment value being for the plurality of APs to uniformly apply to their respective per-antenna transmission power levels. The processor-readable code, when executed by the at least one processor in conjunction with the at least one modem, may be configured to cause the plurality of APs to transmit the joint transmission to the at least one STA based on the normalized gain adjustment value.

In some implementations, the processor-readable code, when executed by the at least one processor in conjunction with the at least one modem, may be configured to obtain the data for the joint transmission. In some implementations, the processor-readable code, when executed by the at least one processor in conjunction with the at least one modem, may be configured to determine a plurality of antennas to participate in the joint transmission, the plurality of antennas including one or more antennas of each AP of the plurality of APs. In some implementations, the processor-readable code, when executed by the at least one processor in conjunction with the at least one modem, may be configured to obtain sounding feedback from the plurality of APs for the plurality of antennas based on the plurality of sounding procedures. In some implementations, the processor-readable code, when executed by the at least one processor in conjunction with the at least one modem, may be configured to determine beamforming information for the plurality of antennas based on the sounding feedback. In some implementations, the processor-readable code, when executed by the at least one processor in conjunction with the at least one modem, may be configured to precode the data for simultaneous transmission to the at least one STA by the plurality of antennas based on the beamforming information.

In some implementations, the processor-readable code, when executed by the at least one processor in conjunction with the at least one modem, may be configured to determine a plurality of individual gain adjustment values, each individual gain adjustment value being associated with a respective AP of the plurality of APs. In some implementations, the processor-readable code, when executed by the at least one processor in conjunction with the at least one modem, may be configured to determine the normalized gain adjustment value based on the plurality of individual gain adjustment values. The normalized gain adjustment value may be a greatest individual gain adjustment value of the plurality of individual gain adjustment values.

In some implementations, the processor-readable code, when executed by the at least one processor in conjunction with the at least one modem, may be configured to determine a plurality of overshoot power levels for the plurality of APs, each of the overshoot power levels representing an amount of power for the joint transmission above the respective sounding power level for the respective AP. In some implementations, the processor-readable code, when executed by the at least one processor in conjunction with the at least one modem, may be configured to determine a plurality of backoff power values for the plurality of APs, respectively. In some implementations, the processor-readable code, when executed by the at least one processor in conjunction with the at least one modem, may be configured to subtract the plurality of backoff power values from the plurality of overshoot power levels, respectively. Each of the individual gain adjustment values may be based on the subtraction. In some implementations, the processor-readable code, when executed by the at least one processor in conjunction with the at least one modem, may be configured to determine the normalized gain adjustment value based on the plurality of individual gain adjustment values.

In some implementations, the processor-readable code, when executed by the at least one processor in conjunction with the at least one modem, may be configured to receive the plurality of backoff power values from the plurality of APs, respectively. Each of the backoff power values may represent a difference between the respective sounding power level and a power limit for the respective APs.

In some implementations, the wireless communication device may include at least one transceiver coupled to the at least one modem and a housing that encompasses the at least one modem, the at least one processor, the at least one memory, the at least one transceiver.

Another innovative aspect of the subject matter described in this disclosure can be implemented in a wireless communication device of a first AP of access points APs con-figured to participate in a joint transmission to at least one STA. The wireless communication device may include at least one modem, at least one processor communicatively coupled with the at least one modem, and at least one memory communicatively coupled with the at least one processor and storing processor-readable code. The processor-readable code, when executed by the at least one processor in conjunction with the at least one modem, may be configured to receive data from a network device. The data may be for a joint transmission by a plurality of APs to at least a first STA. The plurality of APs may include at least the first AP and a second AP. In some implementations, the processor-readable code, when executed by the at least one processor in conjunction with the at least one modem, may be configured to determine a normalized gain adjustment value. The normalized gain adjustment value may be based on a plurality of sounding power levels for a plurality of sounding procedures between the plurality of APs and the at least one STA. Each of the sounding power levels may be determined for a respective one of the APs for a respective one of the sounding procedures with the at least one STA. In some implementations, the processor-readable code, when executed by the at least one processor in conjunction with the at least one modem, may be configured to adjust per-antenna transmission power levels of the first AP based on the normalized gain adjustment value. The normalized gain adjustment value may be uniformly applied by the plurality of APs to their respective per-antenna transmission power levels. The wireless communication device may include at least one modem configured to output at least a portion of the joint transmission for transmission to the at least one STA based on the adjusted transmission power level.

In some implementations, the processor-readable code, when executed by the at least one processor in conjunction with the at least one modem, may be configured to receive the normalized gain adjustment value from the network device.

In some implementations, the processor-readable code, when executed by the at least one processor in conjunction with the at least one modem, may be configured to receive the data in a form of a precoded joint transmission having been precoded by the network device.

In some implementations, the processor-readable code, when executed by the at least one processor in conjunction with the at least one modem, may be configured to receive beamforming information associated with one or more other APs of the plurality of APs. The beamforming information may be based on sounding feedback for the plurality of sounding procedures. In some implementations, the processor-readable code, when executed by the at least one processor in conjunction with the at least one modem, may be configured to precode the data for simultaneous transmission to the at least one STA based on the beamforming information and the normalized gain adjustment value.

Another innovative aspect of the subject matter described in this disclosure can be implemented in a wireless communication device. The wireless communication device may include at least one modem, at least one processor communicatively coupled with the at least one modem, and at least one memory communicatively coupled with the at least one processor and storing processor-readable code that, when executed by the at least one processor in conjunction with the at least one modem, is configured to perform the any of the above methods.

Another innovative aspect of the subject matter described in this disclosure can be implemented in an access point. The access point may include a wireless communication device.

The wireless communication device may include at least one modem, at least one processor communicatively coupled with the at least one modem, and at least one memory communicatively coupled with the at least one processor and storing processor-readable code that, when executed by the at least one processor in conjunction with the at least one modem, is configured to perform the any of the above methods. The access point may include at least one transceiver coupled to the at least one modem, a plurality of antennas coupled to the at least one transceiver to wirelessly transmit signals output from the at least one transceiver, and a housing that encompasses the at least one modem, the at least one processor, the at least one memory, the at least one transceiver and at least a portion of the plurality of antennas.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
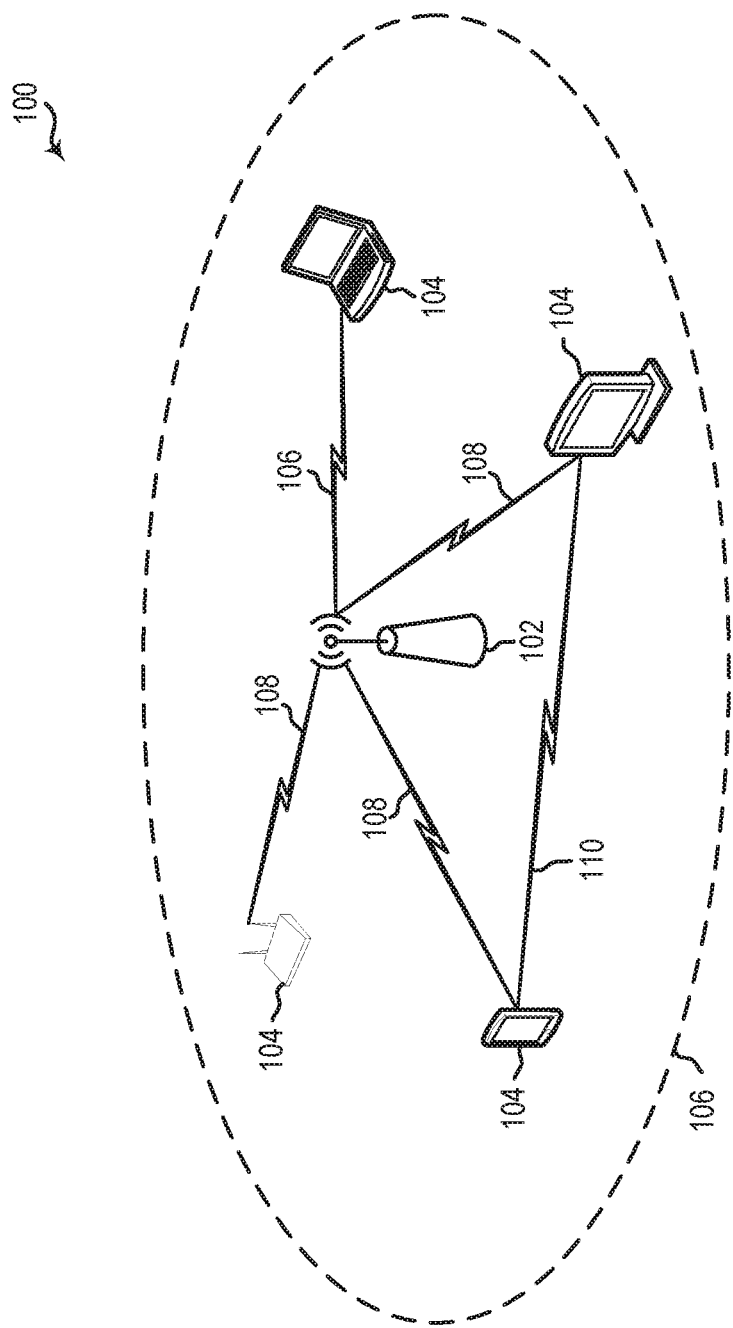
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Joint transmission refers to a feature in which a collection of antennas from more than one access point (AP) are used to simultaneously transmit a coordinated beamformed transmission to a station (STA). The joint transmission uses multiple-input-multiple-output (MIMO) beamforming that is applied by a precoding entity (for example, in a central controller, master AP or a one of the APs in a group of APs participating in the joint transmission). The precoding entity is configured to precode the joint transmission across a collection of antennas from multiple APs. Thus, the precoding entity may be referred to as a common precoder that precodes the joint transmission for all of the APs that participate in the joint transmission. The joint transmission is synchronized in time, frequency, and phase. Joint transmission also may be referred to as network MIMO (N-MIMO), Cooperative Multipoint (CoMP), Distributed MIMO (D-MIMO), or Cooperative MIMO (Co-MIMO), among other examples.

Various implementations relate generally to determining a normalized gain adjustment that can be applied to transmission power levels of the APs that participate in a joint transmission. Some implementations more specifically relate to network device determining the normalized gain adjustment. The network device may be a central controller or one of the APs in a group of APs. In some implementations, the precoding entity may be included in or part of the network device. For brevity, the network device may be described as a central controller. However, it should be clear that one of the APs may serve as the central controller and thus also the recited network device. In some implementations, the network device may collect AP gain values from the plurality of APs. In some implementations, the network device may determine the normalized gain adjustment to be uniformly applied the joint transmission as part of a precoding process. In some implementations, the network device may send a normalized gain adjustment value to an AP so that each AP can uniformly apply the normalized gain adjustment value to adjust their respective transmission power levels. Other implementations more specifically relate to communication of AP gain adjustment values determined by each AP from the APs to the network device that determines a normalized gain adjustment value based on the AP gain adjustment values. In some implementations, the APs communicate the AP gain values to a network device and the network device may send a highest AP gain adjustment value to the APs to be used as a normalized gain adjustment value. In some implementations, each AP can receive AP gain adjustment values from other APs and determine the normalized gain adjustment value. Thus, each AP may adjust its transmission power levels based on a highest AP gain adjustment value from the plurality of APs participating in a joint transmission.

Typically, before the APs transmit a joint transmission, the APs will perform a sounding procedure that can be used to determine the beamforming information for the collection of antennas. The sounding procedure includes the AP sending one or more sounding transmissions using a sounding power level that is less than a power limit supported for each antenna of each AP. The STA may respond to the one or more sounding transmissions with sounding feedback. Sounding feedback may be used to precode data for a joint transmission. For example, the AP may determine beamforming information based on the sounding feedback and provide the beamforming information to a precoding entity. Additionally, or alternatively, the APs may provide the sounding feedback to the network device so that the network device can determine the beamforming information. In some implementations, the network device (such as the master AP or the first device) may precode the joint transmission based on the beamforming information. The precoded joint transmission may be associated with transmission power levels for each AP of the plurality of APs. The transmission power levels may be different from the sounding power levels. In some scenarios, the transmission power levels may need to be adjusted to ensure that no transmit power level for an antenna of the collection of antennas will exceed a power limit for that antenna.

An AP may adjust power of transmissions using a gain adjustment (which also may be referred to as a power adjustment). When multiple APs participate in a joint transmission, a disparity in the gain adjustments made by the different APs may impact performance of the joint transmission. For example, the joint transmission may be degraded or less effective if the gain adjustment applied to antennas of one AP is different from the gain adjustment applied to antennas of another AP. If the differing gain adjustments by the APs differ by more than a threshold value (such as one decibel), the joint transmission may suffer from decreased throughput. When a normalized gain adjustment is uniformly applied to the transmission power levels by each of the APs, the joint transmission would have a same gain adjustment for their respective antennas. Thus, a normalized gain adjustment may prevent a disparate gain adjustment being applied by different APs.

In some implementations, the APs may determine a sounding power level for the sounding procedure so that when the transmission power levels are adjusted by the normalized gain adjustment the adjusted transmission power levels will not exceed a power limit. For example, the sounding power level may be sufficiently less than a maximum power limit supported for each antenna of each AP so that the adjusted transmission power levels will not overshoot the maximum power limit supported for the antennas. In some implementations, the APs may determine a backoff power value to reduce the sounding power level for the one or more sounding transmissions of the sounding procedure. The backoff power value may be based on power limits for the antennas at each AP. Thus, in some implementations, the backoff power value may be different for each AP.

In some implementations, a network device (such as the central controller or an AP serving as the central controller) may determine the normalized gain adjustment based on the backoff power values used by the APs participating in the joint transmission. Each AP may send their respective backoff power values to the network device. The network device may determine the normalized gain adjustment based on a highest gain adjustment value of the gain adjustment values that would otherwise be determined for each AP.

In some implementations, a network device may determine an overshoot power level for each of the APs and determine a normalized gain adjustment that would keep the transmission power levels below the power limits for each of the APs. For example, the network device may determine AP gain adjustment values for each AP based on the sounding feedback obtained by each AP. The network device may determine the normalized gain adjustment based on a maximum of the AP gain adjustment values.

As described herein, the network device may be one of the APs the APs participating in the joint transmission. In some implementations, the network device also may include the precoding entity that prepares the joint transmission for the APs. The network device may determine the normalized gain adjustment based on AP gain adjustment values received from one or more of the APs participating in the joint transmission. Each of the APs participating in the joint transmission may communicate a corresponding AP gain adjustment value to the network device. The network device may determine the highest AP gain adjustment value and communicate the highest AP gain adjustment value as the normalized gain adjustment to each of the APs so that each AP will apply the same gain adjustment.

In some implementations, a first AP may determine the normalized gain adjustment value based on information received from the other APs participating in the joint transmission. For example, the other APs may communicate their respective AP gain adjustment value (or backoff power value) to the first AP. The first AP may determine the normalized gain adjustment based on the AP gain adjustment values received from the other APs. In some implementations, all APs participating in the joint transmission may exchange their AP gain adjustment values and may determine the normalized gain adjustment values therefrom. Thus, in some implementations, the normalized gain adjustment value may be determined in a distributed architecture.

Particular implementations of the subject matter described in this disclosure can be implemented to realize one or more of the following potential advantages. In some implementations, the described techniques can be used to determine a normalized gain adjustment value that can be applied uniformly to all antennas of a collection of antennas (from different APs). A potential advantage of using a normalized gain adjustment value is that the joint transmission will not suffer from a disparate gain error that would other occur when different APs use different gain values. The disparate gain error is defined as a change in relative powers across APs during the joint transmission stage, compared to the relative powers used during a sounding stage. The goal of the normalized gain adjustment is to keep the relative powers across APs during joint transmission stage to be same or as close as possible to the relative powers that were used during the sounding stage.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11 ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GigaHertz (GHz), 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11 ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 megaHertz (MHz) band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple channels (which may be used as subchannels of a larger bandwidth channel as described below). For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels (which may be referred to as subchannels).

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a first portion (or "legacy preamble") and a second portion (or "non-legacy preamble"). The first portion may be used for packet detection, automatic gain control and channel estimation, among other uses. The first portion also may generally be used to maintain compatibility with legacy devices as well as non-legacy devices. The format of, coding of, and information provided in the second portion of the preamble is based on the particular IEEE 802.11 protocol to be used to transmit the payload.

Figure 2:
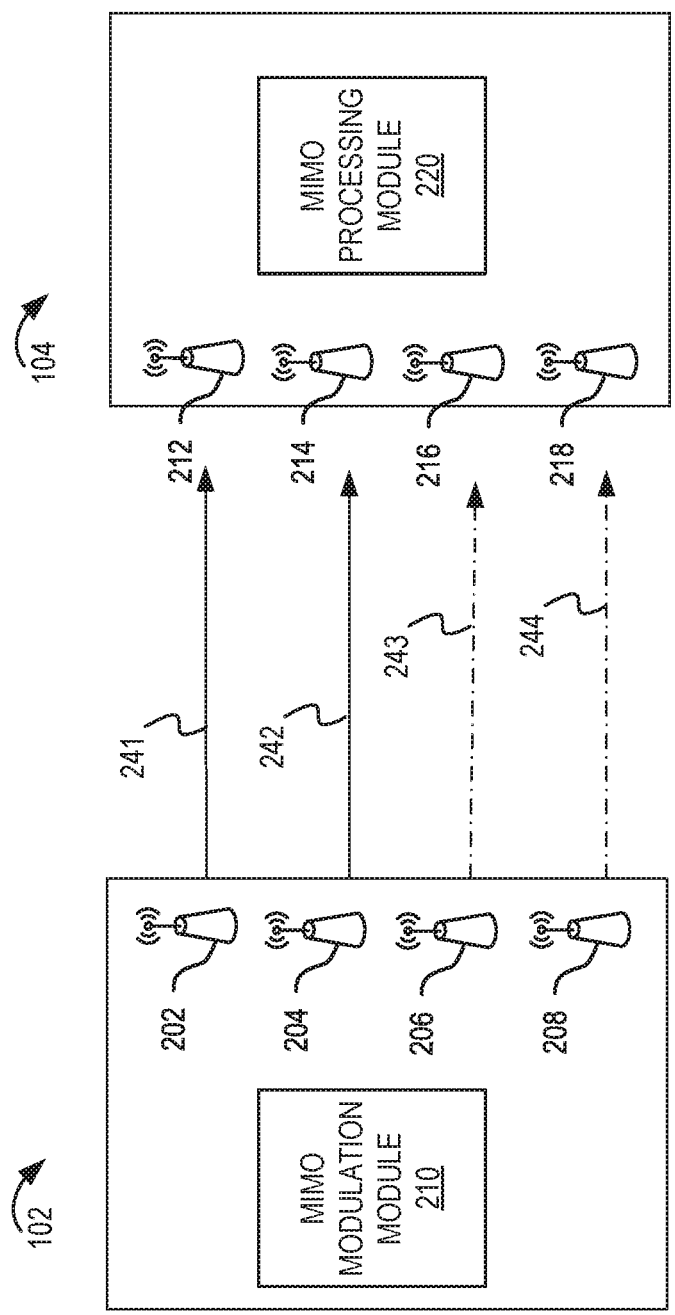
FIG. 2 shows a pictorial diagram of multiple-input-multiple output (MIMO) communications.

FIG. 2 shows a pictorial diagram of multiple-input-multiple output (MIMO) communications. APs (such as AP 102) and STAs (such as STA 104) that include multiple antennas may support various diversity schemes. In FIG. 2, AP 102 includes four antennas 202, 204, 206, and 208. STA 104 includes antennas 212, 214, 216, and 218. The quantities of antennas in each of the AP 102 and STA 104 are provided only as examples, and other quantities of antennas may be used. In some implementations, the quantity of antennas in STA 104 may be different from the quantity of antennas in AP 102. Spatial diversity may be used by one or both of a transmitting device or a receiving device to increase the robustness of a transmission. For example, to implement a transmit diversity scheme, the AP 102 may transmit the same data redundantly over two or more antennas. APs and STAs that include multiple antennas also may support space-time block coding (STBC). With STBC, a transmitting device also transmits multiple copies of a data stream across a number of antennas to exploit the various received versions of the data to increase the likelihood of decoding the correct data. More specifically, the data stream to be transmitted is encoded in blocks, which are distributed among the spaced antennas and across time. Generally, STBC can be used when the number $N_{Tx}$ of transmit antennas exceeds the number $N_{SS}$ of spatial streams (described below). The $N_{SS}$ spatial streams may be mapped to a number $N_{STS}$ of space-time streams, which are mapped to $N_{Tx}$ transmit chains.

APs and STAs that include multiple antennas also may support spatial multiplexing, which may be used to increase the spectral efficiency and the resultant throughput of a transmission. To implement spatial multiplexing, the transmitting device divides the data stream into a number $N_{SS}$ of separate, independent spatial streams. The spatial streams are separately encoded and transmitted in parallel via the multiple $N_{Tx}$ transmit antennas. If the AP 102 includes $N_{Tx}$ transmit antennas and the STA 104 includes $N_{Rx}$ receive antennas, the maximum number $N_{SS}$ of spatial streams that the AP 102 can simultaneously transmit to the STA 104 is limited by the lesser of $N_{Tx}$ and $N_{Rx}$.

In some implementations, the AP 102 and STAs 104 may be able to implement both transmit diversity as well as spatial multiplexing as shown in FIG. 2. For example, in instances in which the number $N_{SS}$ of spatial streams is less than the number $N_{Tx}$ of transmit antennas, the spatial streams may be multiplied by a spatial expansion matrix to achieve transmit diversity. In FIG. 2, the AP 102 is transmitting a first spatial stream using transmit diversity as a first signal 241 from antenna 202 of the AP 102 to antenna 212 of the STA 104 and a second signal 242 from antenna 204 of the AP 102 to antenna 214 of the STA 104. The first signal 241 and the second signal 242 may be redundant copies of the same data. The AP 102 is transmitting a second spatial stream using transmit diversity as a third signal 243 from antenna 206 of the AP 102 to antenna 216 of the STA 104 and a fourth signal 244 from antenna 208 of the AP 102 to antenna 218 of the STA 104. The third signal 243 and the fourth signal 244 may be redundant copies of the same data. However, the data for the first spatial stream (in signals 241 and 242) may be different from the data for the second spatial stream (in signals 243 and 244). A MIMO modulation module 210 in the AP 102 may determine the spatial streams and modulate the data for each spatial stream for transmission by the antennas 202, 204, 206, and 208. A MIMO processing module 220 of the STA 104 may process the received signals 241, 242, 243, and 244 to recover the spatial streams.

Figure 3:
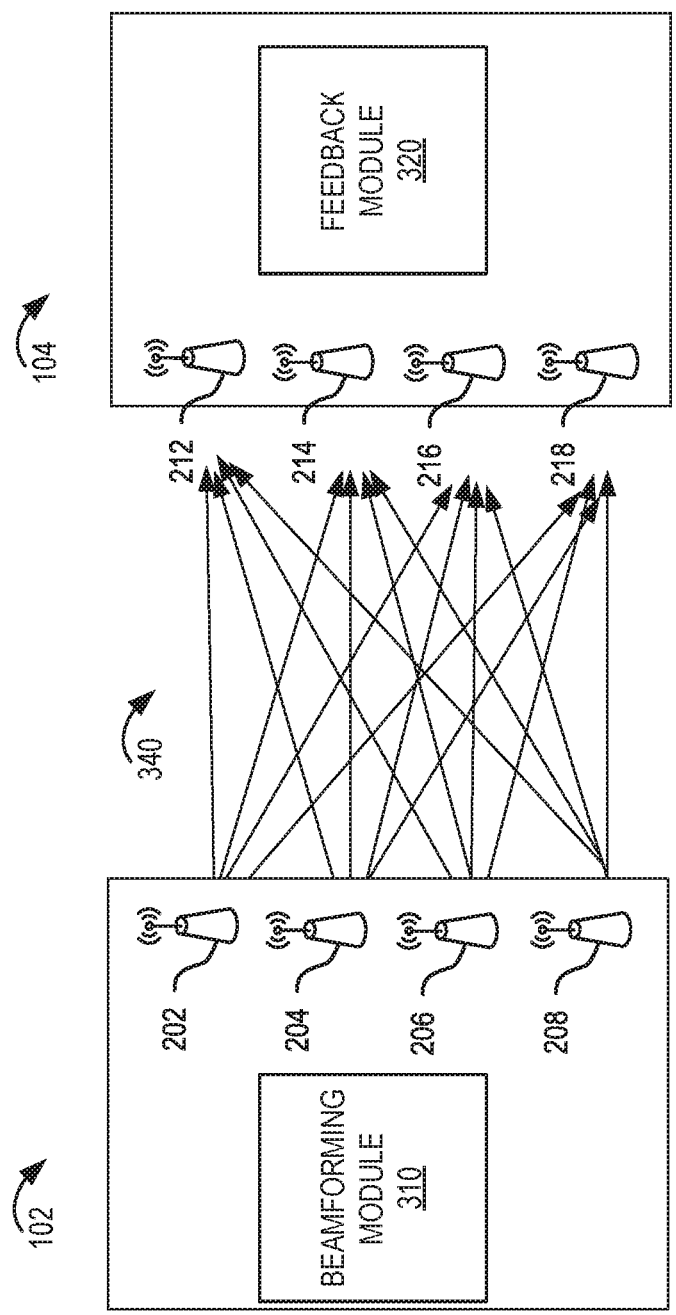
FIG. 3 shows a pictorial diagram of beamforming MIMO communications.

FIG. 3 shows a pictorial diagram of beamforming MIMO communications. As described in FIG. 2, the AP 102 in FIG. 3 includes four antennas 202, 204, 206, and 208. The STA 104 includes antennas 212, 214, 216, and 218. APs and STAs that include multiple antennas also may support beamforming. Beamforming refers to the focusing of the energy of a transmission in the direction of a target receiver. Beamforming may be used both in a single-user context, for example, to improve a signal-to-noise ratio (SNR), as well as in a multi-user (MU) context, for example, to enable MU multiple-input multiple-output (MIMO) (MU-MIMO) transmissions (also referred to as spatial division multiple access (SDMA)). To perform beamforming, a transmitting device (such as AP 102), referred to as the beamformer, transmits signal 340 from each of multiple antennas 202, 204, 206, and 208. The beamformer configures the amplitudes and phase shifts between the signals 340 transmitted from the different antennas such that the signals add constructively along particular directions towards the intended receiver (such as STA 104), which is referred to as a beamformee. A beamforming module 310 in the AP 102 may determine the amplitudes and phase shifts for the various signals 340. The manner in which the beamformer configures the amplitudes and phase shifts depends on channel state information (CSI) associated with the wireless channels over which the beamformer intends to communicate with the beamformee.

To obtain the CSI for beamforming, the beamformer may perform a channel sounding procedure with the beamformee. For example, the beamformer may transmit one or more sounding signals (for example, in the form of a null data packet (NDP)) to the beamformee. The beamformee may perform measurements for each of the $N_{Tx} \times N_{Rx}$ subchannels corresponding to all of the transmit antenna and receive antenna pairs based on the sounding signal. For example, a feedback module 320 of the beamformee may generate a feedback matrix based on the channel measurements and, typically, compresses the feedback matrix before transmitting the feedback to the beamformer. The beamformer may generate a precoding (or "steering") matrix for the beamformee based on the feedback and use the steering matrix to precode the data streams to configure the amplitudes and phase shifts for subsequent transmissions to the beamformee.

As described above, the AP 102 may support the use of diversity schemes. When performing beamforming, the transmitting beamforming array gain is logarithmically proportional to the ratio of $N_{Tx}$ to $N_{SS}$. It is generally desirable, within other constraints, to increase the number $N_{Tx}$ of transmit antennas when performing beamforming to increase the gain. It is also possible to more accurately direct transmissions by increasing the number of transmit antennas. This may be advantageous, for example, in MU transmission contexts in which it is desirable to reduce inter-user interference.

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs also may be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 4A:
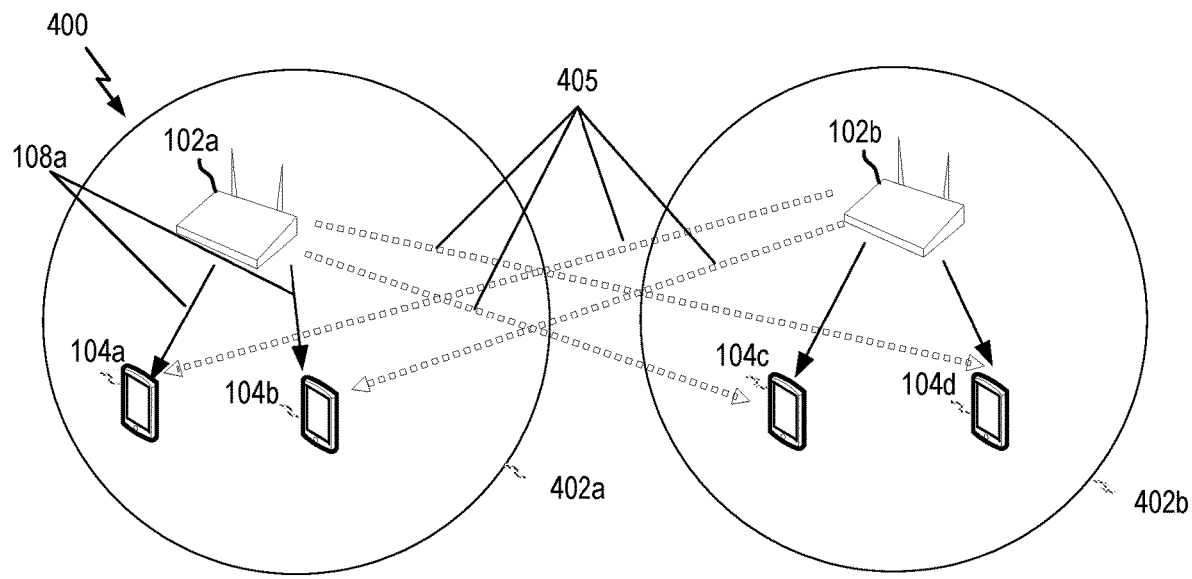
FIG. 4A shows a pictorial diagram of an example MIMO wireless communication system in which coordinated beamforming is employed by a plurality of access points (APs) to communicate with a plurality of stations (STAs) belonging to corresponding basic service sets (BSSs).

FIG. 4A shows a pictorial diagram of an example MIMO wireless communication system 400 in which coordinated beamforming (COBF) is employed by a plurality of APs 102a-b to communicate with a plurality of STAs 104ad belonging to corresponding basic service sets (BSSs) 402ab. The APs 102, STAs 104, and BSSs 402 illustrated in FIG. 4A have the same functionality as the APs 102, STAs 104, and BSSs described previously. AP 102a is associated with STA 104a-b. AP 102b is associated with STAs 104c-d. An AP 102 that is associated with a STA 104 may be referred to as a BSS AP for the STA throughout this disclosure. Similarly, an AP 102 for which there is no association with a particular STA 104 may be referred to as an overlapping BSS (OBSS) AP for the STA throughout this disclosure. Associations between an AP 102 and one or more STAs 104 provides for, in part, coordination of communication between devices within the BSS defined by the AP 102 and its associated STAs 104. For example, devices within each BSS may exchange signals with each other. The signals may function to coordinate transmissions from the respective AP 102a-b and stations within the AP's BSS 402a-b.

The APs 102a-b (also referred to herein collectively as "the APs 102" or individually as "the AP 102") communicate with the STAs 104a-d (also referred to herein collectively as "the STAs 104" or individually as "the STA 104"). In some implementations, the wireless communication system 400 may not have a central AP 102, but rather may function as a peer-to-peer network (such as TDLS or WiFi-Direct, among other examples) between the STAs 104. Accordingly, the functions of the APs 102a-b described herein may alternatively be performed by one or more of the STAs 104.

The APs 102a-b may communicate with one or more STAs 104 at any given moment via communications links 108. One example communication link 108a may facilitate transmission between the AP 102a and one or more of its associated STAs 104a and 104b of the BSS 402a. As shown in FIG. 4A, data transmissions to BSS STAs 104 are shown as solid lines between the AP 102a and STAs 104a-b and AP 102b and STAs 104c-d, while steered null transmissions 405 to OBSS STAs are shown as dashed lines between the AP 102a and STAs 104c-d and AP 102b and STAs 104a-b.

Accordingly, each AP 102a-b may use coordinated beamforming to simultaneously communicate with corresponding BSS (or associated) STAs 104a-d while nulling OBSS (or non-associated) STAs 104a-d. The coordinated beamforming may allow the APs 102a-b to simultaneously transmit data to respective BSS STAs 104 without causing interfering with the OBSS STAs 104. Therefore, in the system 400, transmissions for a particular STA 104 are only transmitted from a single AP 102 while the STA 104 only receives nulls from OBSS APs 102.

Figure 4B:
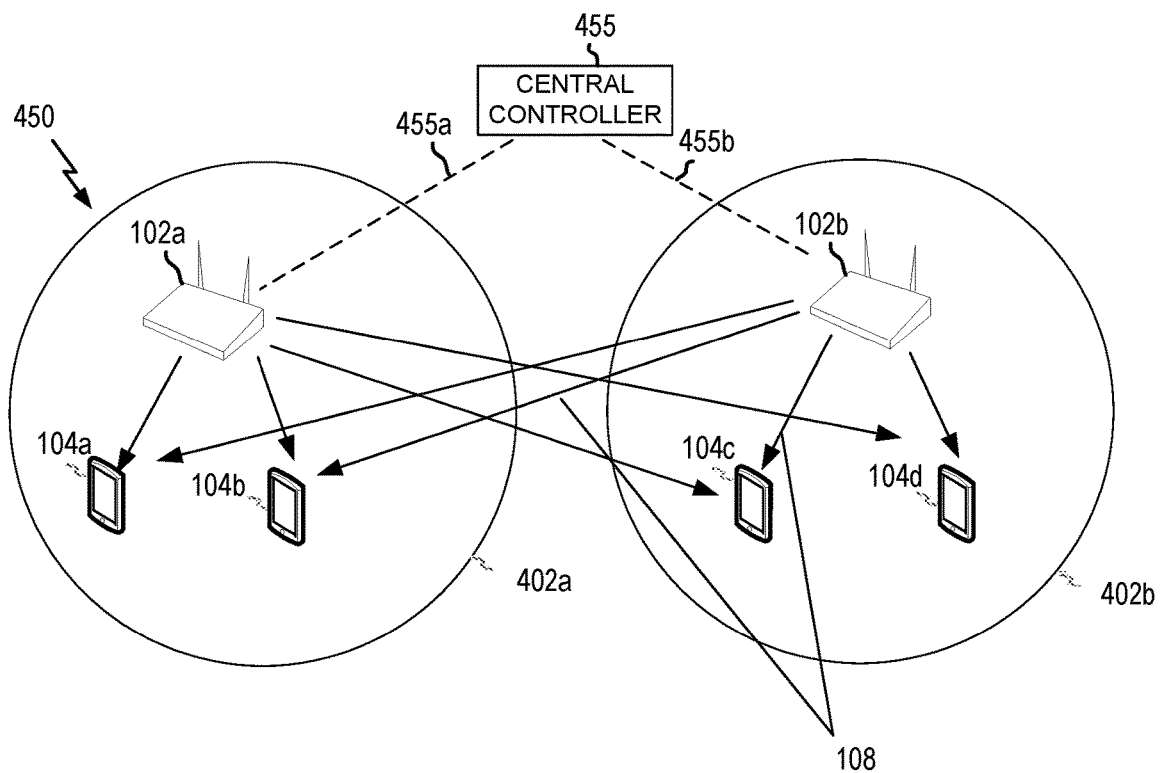
FIG. 4B shows a pictorial diagram of an example joint transmission multiple-access MIMO wireless communication system in which a joint transmission may be used by the plurality of APs to communicate with the plurality of STAs.

FIG. 4B shows a pictorial diagram of an example joint transmission multiple-access MIMO wireless communication system 450 in which a joint transmission may be used by the plurality of APs to communicate with the plurality of STAs. In FIG. 4B, COBF may be used by APs 102 to communicate with STAs 104 belonging to their own and other BSSs 402. FIG. 4B includes similar components as described with reference to FIG. 4A, including the AP 102a and the STAs 104a-b in BSS 402a and the AP 102b and the STAs 104c-d in BSS 402b.

As described with reference to FIG. 4A, the APs 102a-b may communicate with one or more STAs 104 at any given moment via communications links 108. However, contrary to the APs 102a-b of FIG. 4A, the APs 102a-b may both be configured to transmit data to a single STA 104 (such as STA 104a). As shown in FIG. 4B, data transmissions to STAs 104 are shown as solid lines between the APs 102a-b and all of the STAs 104*a-d*. As opposed to the communications links 108 shown in FIG. 4A, FIG. 4B includes no steered null transmissions 405 to OBSS STAs 104 from APs 102 (there are no dashed lines between either of the APs 102*a-d* and any of the STAs 104*c-d*). Instead all of the communication links 108 shown, including the identified communication links 108 from AP 102*b* to STA 104*c* and STA 104*b*, are data transmissions between the APs 102*a-b* and the STAs 104*a-d*.

When each of the APs 102*a-b* are able to transmit data to each STA 104, the data to be transmitted to each STA 104 may be made available to each of the APs 102*a-b* so that either of the APs 102*a-b* may transmit all or a portion of the data to the STA 104 as a joint transmission. The APs 102*a-b* may coordinate the joint transmission to the STA 104. When only a single AP (such as either the 102*a* or the AP 102*b*) transmits data to a STA 104, the single AP may manage power transmission levels independently. However, when multiple APs (such as the APs 102*a-b*) are transmitting data as a joint transmission to the STA 104, the transmissions of each AP is coordinated with the other APs. For example, the APs 102*a-b* may coordinate transmission of data so to ensure that redundant copies of data transmissions can be prevented, that all data is transmitted by one or both of the APs 102*a-b*, or that data transmissions do not interfere with each other, among other examples. In some implementations, a network device may control and coordinate the transmission from the APs 102*a-b* to a particular STA 104. For example, the network device may be a master access point (AP) 102 (such as AP 102*a*) or an external controller (such as central controller 455). For brevity, the network device is described as a central controller 455. However, in some implementations, the network device may be one of the APs (such as AP 102*a*) that performs the features described with reference to the central controller 455.

The central controller 455 may establish a communication path between itself and all APs 102 that will participate in a joint transmission. For example, the communication path between the central controller 454 and the APs 102 may include a backhaul network. The backhaul network may include backhaul links 455*a* and 455*b* between the central controller 455 and the communicating APs 102 (such as APs 102*a* and 102*b*). When an AP (such as the AP 102*a*) serves as the central controller 455, that AP may be referred to as a master AP. The remaining APs of the joint transmission communication system 450 may be referred to as slave APs. When the central controller 455 manages the joint transmission communication system 450, the APs 102*a-b* of the joint transmission communication system 450 may be slave APs subordinate to the central controller 455 with regard to the joint transmissions. In some implementations, the central controller 455 may utilize a precoder configured to precode the joint transmissions for transmission over an array of antennas. When the central controller 455 performs the precoding of the joint transmissions, the central controller 455 also may be referred to as a precoding entity. In some implementations, one of the APs (such as AP 102*a* or AP 102*b*) may be the precoding entity to perform precoding of the joint transmissions. Precoding may include preparing the data for transmission by a collection of transmitter antennas of the first AP 102*a* and transmitter antennas of the second AP 102*b*. In some implementations, the central controller 455 may coordinate timing synchronization between the APs 102*a-b* and their respective transmitter antennas. The precoder may ensure that transmissions from APs 102*a-b* to a particular STA 104 will not be too strong at other STAs 104. The coordinated timing synchronization may be useful to reduce interference to the other STAs when different APs 102*a-b* jointly transmit the transmissions to one or more STAs 104.

In some implementations, the central controller 455 coordinating timing synchronization between the APs 102 and the STA 104 also may control or manage synchronization between the APs 102. In some implementations, the central controller 455 may enable efficient and complete joint transmissions between the APs 102 and the STA 104. For example, the central controller 455 may track or synchronize the phase deltas across the APs 102. A phase delta also may be referred to as a relative phase and indicates a deviation of the phase from one AP to another AP. In some implementations, the phase of an AP 102 can be thought to be equal to or related to a local oscillator ("LO") phase (measured in degrees or radians). If a frequency of the LO is constant (such as no jitters), the phase of the LO may change linearly with time. Each AP 102 may manage the phase using their respective LO. However, if different APs 102 have slightly different frequencies at their LOs, the phase of the APs 102 may diverge with time. Additionally, the phase of APs 102 may change due to phase noise that may be different for each AP 102. Moreover, any timing offsets between one AP 102 and a STA 104 may appear as a jitter or a phase ramp in frequency in the channel from that AP 102 to the STA 104.

In some implementations, a particular STA may observe different phase-ramps corresponding to different APs 102. Such an arrangement is acceptable when the difference between the phase ramps stays constant. In contrast, a change in relative phase of the APs 102 beyond a threshold amount can result in the precoding no longer being valid. The phase of an AP 102 may impact a power levels of transmissions by the APs 102. A "relative" phase of the various APs 102*a-b* may be measured during a sounding period. However, a change in the relative phase after the sounding period before a time of the joint transmission may degrade performance of the joint transmission. Since precoding for the joint transmission was done based on the relative phase measured during the sounding period, the precoding may not be valid if the relative phase drifts beyond a limit or threshold amount. The relative phase drift may result in the strength of a signal or transmission meant for one user being high enough at a second user to cause interference at the second user. In contrast, when the relative phase does not drift beyond the threshold amount, a first STA may receive signals or transmissions meant for the first STA while other signals or transmissions meant for other STAs are weak enough to not cause interference for the first STA. Thus, it may be desirable to maintain phases (or changes in relative phase) between APs within a limit or threshold amount.

A central controller 455 or the APs 102*a-b* may manage relative phase synchronization to improve efficiency of a joint transmission or to limit interference caused to various STAs. Accordingly, when the phase drift exceeds a threshold amount, the central controller 455 or the APs 102*a-b* may synchronize their respective phases and maintain their respective phases changes to within a phase drift threshold.

In some implementations, the phase deltas of the APs 102 participating in the joint transmissions may be maintained at constant levels during the sounding and transmission periods (such as the sounding period and the joint transmission period described herein) of distributed MIMO sessions. Alternatively, or additionally, the phase deltas of the APs 102 participating in the joint transmission may be maintained at approximately a constant level or some other level through periodic phase synchronizations. If the phase deltas of the APs 102 begin to change from the initial phase delta (such as the phase delta begins to increase or decrease), synchronization may be used to "correct" the phase delta (such as phase correction) to the initial value or a value substantially similar to the initial value.

In joint transmissions, the collective antennas 216 of the APs 102 may mimic or operate as a single antenna array. From the perspective of the receiving STA 104, the antennas 216 of the APs 102 may be treated or appear as the single antenna array. However, phase drift or phase delta drifts (hereinafter "phase drifts") may disrupt the "single antenna array" operation or view of the collective antennas of the APs 102. Specifically, while phase drifts may occur in general operation of the APs 102 and their antennas 216, these phase drifts may cause the phase differences of the APs 102 to change between the sounding and joint transmission period. As the phase drifts cause phase differences of the APs 102 between the sounding and the joint transmission periods, the joint transmissions by the APs 102 may be adversely impacted by potentially introducing cross user or cross stream leakage and increasing interference between APs 102 and STAs 104.

Accordingly, such phase drift may desirably be minimized or avoided by synchronizing phases or phase drifts or by avoiding protocols that may lead to an introduction of relative phase offsets across the APs 102. In some implementations, one or more phase drifts may be detected by the central controller 455 or a similar component configured to monitor or track phase drift or phase delta drift between the APs 102. If a phase drift is detected, the central controller 455 may synchronize the phases of one or more of the "drifting" APs 102. Such synchronization may occur during one or more of the sounding period and the joint transmission period. In some implementations, the synchronization may occur during the joint transmission period, for example, when the joint transmission period is of an extended duration (such as more than a traditional data transmission period).

In the joint transmission communication system 450, the backhaul or similar communication network shown with backhaul links 455*a-b* may exist between the APs 102 participating in the joint transmission. The backhaul links 455*a-b* may provide for time or frequency synchronization between the APs 102. For example, the backhaul links 455*a-b* may allow the APs 102 to coordinate their clocks and frequencies over which the APs 102 will communicate. In some implementations, the backhaul links 455*a-b* also may be used to share the data to be transmitted and any data received with all of the APs 102. In some instances, phase synchronization may be performed via the backhaul links 455*a-b* as well.

Phase synchronization signals or transmissions may be used to maintain the phase drift or drift of phase difference between APs 102 to be within a few degrees during the various periods of a communication window or transmission opportunity. The phase synchronization signals may be transmitted by the master AP 102 or the central controller 455.

In certain implementations when the APs 102 have a frequency offset of 10 Hertz (Hz) between each other, a 1 millisecond (MS) time period may result in a 3.6 degree shift in the phase difference between the APs 102. In some implementations, the 3.6 degree phase difference shift may be high enough to warrant phase synchronization at approximately 1 ms intervals. Accordingly, phase synchronization may be implemented at the beginning of each joint transmission. In some implementations, depending on a length of the joint transmission, the phase synchronization may be performed during the joint transmission itself. For example, a master AP 102 may transmit a synchronization frame also referred to as a sync frame) to achieve the phase synchronization across the APs 102.

In some implementations, the APs 102 that utilize automatic gain control (AGC) may experience increased phase difference drifts. For example, different gain states that result from the AGC may result in different amplitudes and phases to correspond with the different gain states. Thus, as the gain states for the APs 102 change, the corresponding amplitudes and phases may change. Thus, in one situation, when a slave AP 102 using AGC attempts to synchronize with the master AP 102 (or the central controller 455), if the gain state of a slave AP 102 is different when the phase synchronization signal is received as compared to the gain state during a previous reference or reference signal, the phase synchronization may not achieve the desired tight phase drift synchronization. In another situation, channel measurements by the STA 104 may have different gain states for different APs 102.

Figure 5:
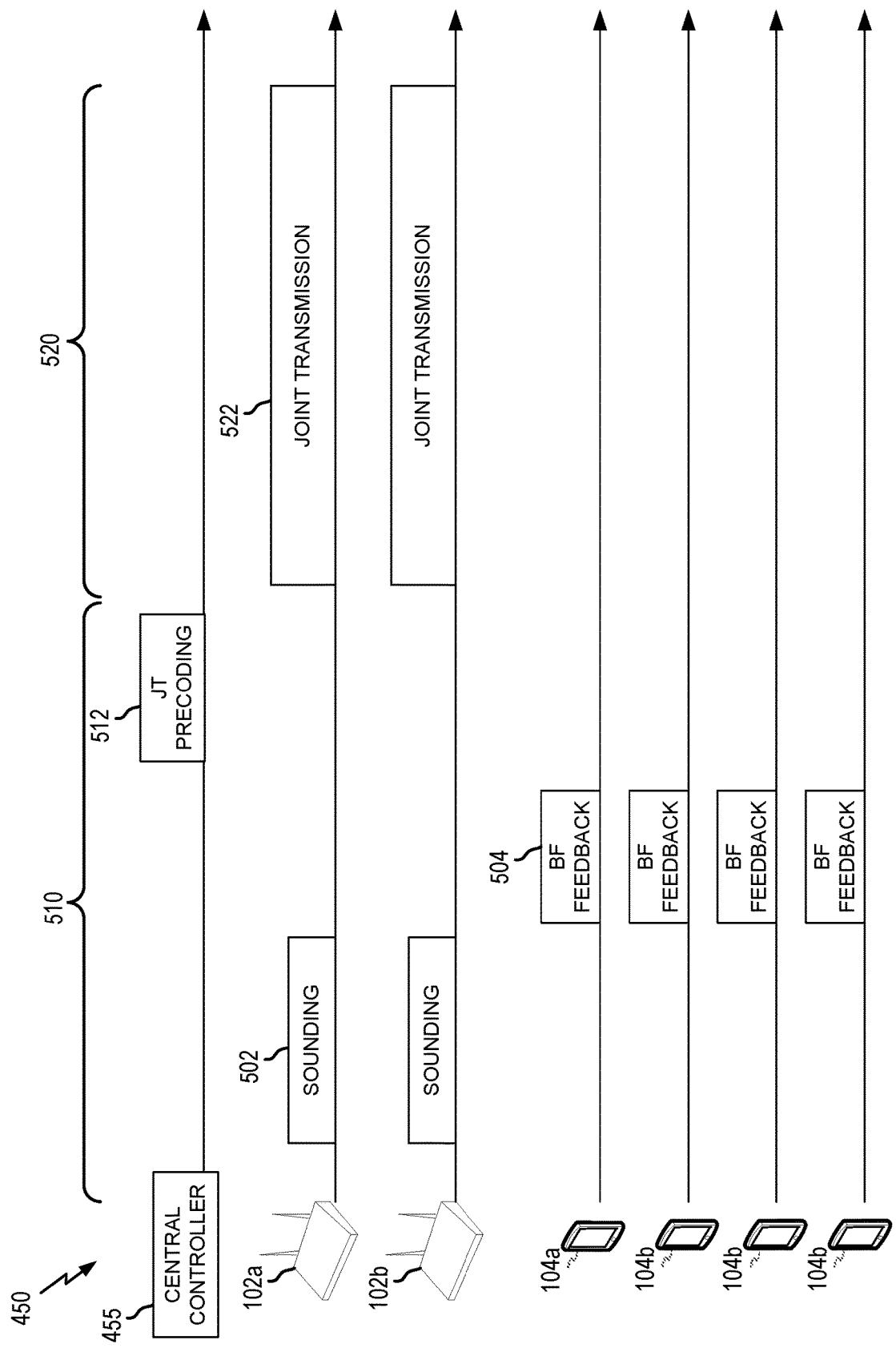
FIG. 5 shows a pictorial diagram of an example downlink joint transmission.

FIG. 5 shows a pictorial diagram of an example downlink joint transmission. The joint transmission communication system 450 may utilize different time periods and power levels for sounding transmissions and joint transmissions. Typically, a sounding period 510 would include sounding signals 502 transmitted by the APs 102 using a sounding power level. The sounding signals 502 may be transmitted concurrently (as shown in FIG. 5) or sequentially. When using sequential sounding signals, a first AP 102*a* would transmit a sounding signal which is subsequently followed by a sounding signal from the second AP 102*b*. Sounding signals may be included in separate null data packet (NDP) or null data packet announcement (NDPA) transmissions. Each NDP transmission may have its own phase and receipt AGC setting and may be communicated at different times for each of the APs 102. Accordingly, it may be difficult for the central controller 455 to utilize sounding measurements resulting from different NDPs together.

For the joint transmission communication system 450, the participating APs 102 may be sounded together (such as at the same time, as shown in FIG. 5). For example, the NDP transmissions for each of the participating APs 102 may be transmitted at the same time. When explicit sounding is used (such as when the sounding information is determined by the STA 104 in response to NDPs transmitted by the APs 102), a joint NDP may be transmitted by the APs 102. The joint NDP may be transmitted by the APs 102 to all of the STAs 104. Feedback received from the STA 104 in response to the NDP transmissions may be received from the STA 104 by any of the APs 102, which can disseminate the received feedback to the other APs 102 of the system 450. In some implementations, the sharing of feedback (and potentially other information) may be accomplished via the backhaul links.

Based on the beamforming feedback 504 received from one or more STAs 104, the central controller 455 may perform joint transmission precoding. For example, the central controller 455 may precode the data to generate a precoded joint transmission that spans multiple antennas of the APs 102*a-b*. The APs 102*a-b* may transmit the precoded joint transmission during a joint transmission period 520. The APs 102*a-b* may transmit the joint transmission using transmission power levels that differ from sounding power levels that were used to transmit the sounding signals 502. However, as will be described with reference to FIG. 6, the transmission power levels may need to be adjusted to prevent any single antenna (from among all the APs sending the joint transmission 522) from exceeding a power limit.

Figure 6:
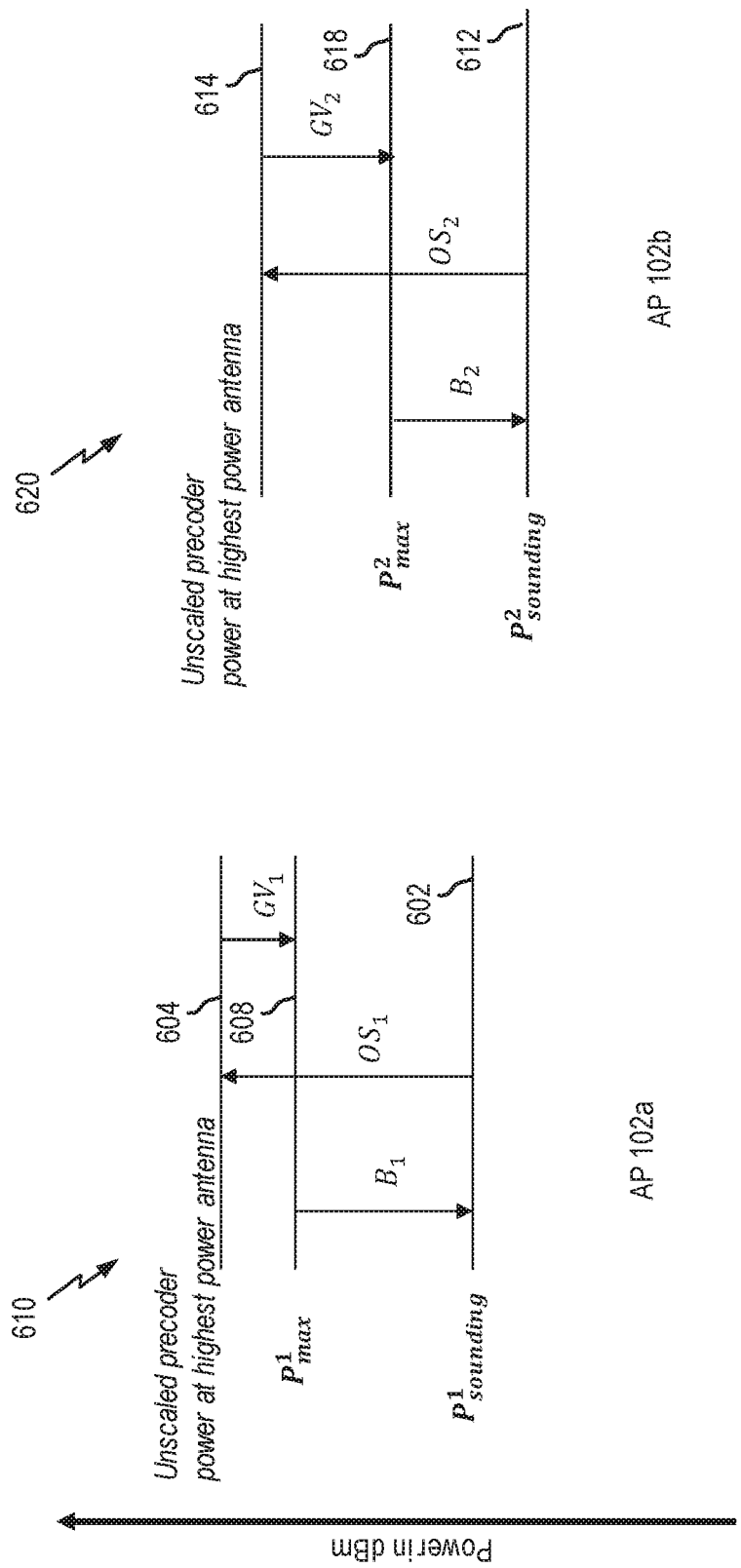
FIG. 6 shows a pictorial diagram of an example power parameters and normalized gain adjustment.

FIG. 6 shows a pictorial diagram of an example power parameters and normalized gain adjustment. A first chart 610 shows the power sounding level 602 (referred to as $P_{sounding}^1$) used by the first AP 102*a* for the sounding signal. The first AP 102*a* may have a power limit 608 (referred to as $P_{max}^1$). The power sounding level 602 may be less than the power limit 608 based on a backoff power value (referred to as $B_1$). After the precoding entity generates the precoded joint transmission, the unscaled transmission power level for the highest power antenna of the first AP 102*a* may be a first power level 604 which exceeds the power limit 608. In a traditional joint transmission system, the first AP 102*a* may adjust the gain of the precoded joint transmission by a first AP gain adjustment value (referred to as $GV_1$).

A second chart 620 shows the power sounding level 612 (referred to as $P_{sounding}^2$) used by the second AP 102*a* for the sounding signal. Notice that the $P_{sounding}^1$ and the $P_{sounding}^2$ may be different sounding power levels as depicted in FIG. 6. The second AP 102*b* may have a power limit 618 (referred to as $P_{max}^2$), which also may be different from the $P_{max}^1$. The power sounding level 612 may be less than the power limit 618 based on a backoff power value (referred to as $B_2$). After the precoding entity generates the precoded joint transmission, the unscaled transmission power level for the highest power antenna of the second AP 102*b* may be a second power level 614 which exceeds the power limit 618. In a traditional joint transmission system, the second AP 102*b* may adjust the gain of the precoded joint transmission by a second AP gain adjustment value (referred to as $GV_2$).

When the $GV_1$ and the $GV_2$ are applied to the transmission power levels separately by the APs 102*a-b*, the resulting relative gain may differ by a relative gain scale error. A relative gain scale error may refer to the difference between a gain adjustments of the different APs 102*a-b*. A relative gain scale error can cause degradation or disturbance to the joint transmission. For example, the gain improvements and throughput capacity may be diminished if the relative gain scale error is above a threshold value. Rather than using different gain adjustment values at the different APs 102*a-b*, it may be desirable to apply a normalized gain adjustment to the transmission power levels used by all antennas (for both the APs 102*a-b*). A normalized gain adjustment may be uniformly applied by both APs 102*a-b* to prevent a relative gain scale error.

In some implementations, a network device (such as a central controller or master AP) may determine an overshoot power level for each of the APs 102 and determine a normalized gain adjustment value that would keep the transmission power levels below the power limits for each of the APs 102. For example, the network device may determine the AP gain adjustment values (the $GV_1$ and the $GV_2$) and determine the normalized gain adjustment based on a maximum from among the AP gain values. Alternatively, the network device may be capable of determining the normalized gain adjustment value based on the backoff power values (the $B_1$ and the $B_2$). Each AP 102 may send the backoff power values to the network device. The network device may determine the normalized gain adjustment value based on a calculation that determines the highest gain adjustment value. Equations 1 and 2 provide examples of how the normalized gain adjustment value may be determined, where i represents an index for each antenna in the collection of antennas from the APs 102*a-b*.

$$\text{normalized gain adjustment value} = \max\{\max_i\{GV_i\}\} \quad (1)$$

$$\text{normalized gain adjustment value} = \max\{\max_i\{OS_i - B_i\}\} \quad (2)$$

In some implementations, a master AP (such as AP 102*a*) may determine the normalized gain adjustment value. Each of the other APs (such AP 102*b* and any other APs 102 participating in the joint transmission) may communicate a corresponding AP gain adjustment value to the master AP. The master AP may determine the normalized gain adjustment value based on the highest AP gain adjustment value. The master AP may communicate the normalized gain adjustment value to each of the APs 102 so that each AP 102 will apply the same gain adjustment.

In some implementations, each AP 102 may determine the normalized gain adjustment value based on information from the other APs 102 participating in the joint transmission. For example, each AP 102 may communicate its AP gain adjustment value (or backoff power value) to the other APs 102 in the joint transmission system. Each AP 102 may use the AP gain adjustment values (or the backoff power values) to determine the same calculated normalized gain adjustment value.

Figure 7:
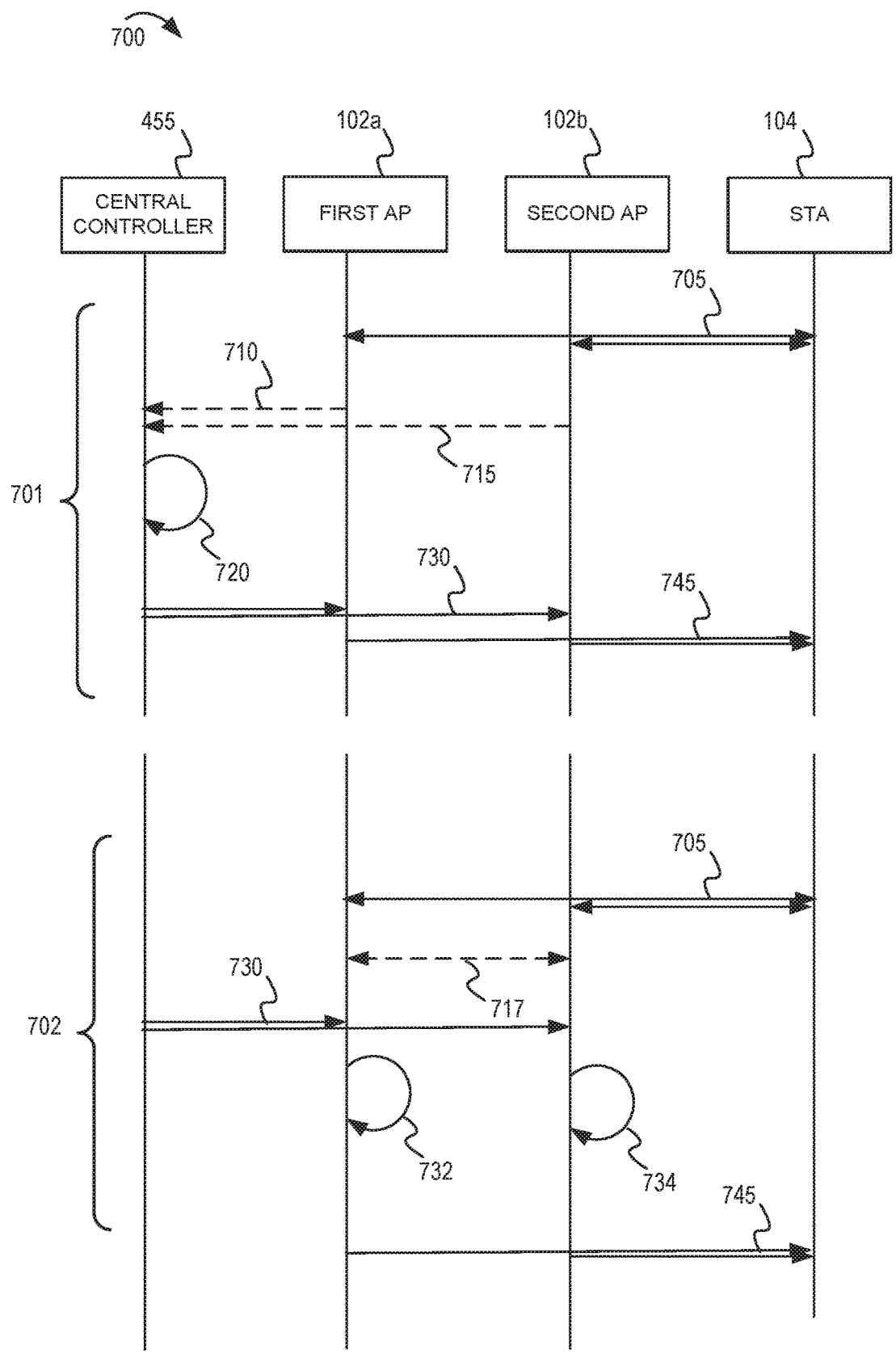
FIG. 7 shows a timing diagram illustrating the transmissions of communications according to some implementations.

FIG. 7 shows a timing diagram 700 illustrating the transmissions of communications according to some implementations. In FIG. 7, a first AP 102*a* and a second AP 102*b* are participating in a joint transmission to a STA 104. A network device (such as a central controller 455) may generate the joint transmission. The central controller 455 also may be part of the first AP 102*a* or the second AP 102*b*.

In a first example 701, the APs 102 may perform a sounding procedure 705 with the STA 104. The APs 102 may send their respective backoff power values (based on a difference between their sounding power level and a power limit for the AP). For example, the first AP 102*a* may send a first backoff power value 710 to the central controller 455. The second AP 102*b* may send a second backoff power value 715 to the central controller 455.

The central controller 455 may generate the precoded joint transmission and determine the transmission power levels. As part of the precoding process 720, the central controller 455 also may determine a normalized gain adjustment value that can be applied to the transmission power levels such that the transmission power levels are uniformly adjusted for all antennas of the APs 102. The central controller 455 may adjust the transmission power levels based on the normalized gain adjustment value. As described above, the normalized gain adjustment value may be based on a calculation that includes the backoff power values 710 and 715. The central controller 455 may send the precoded joint transmission 730 with the adjusted transmission power levels to the APs 102. The APs 102 may transmit the precoded joint transmission 745 with the adjusted transmission power levels to the STA 104.

A second example 702 depicted in FIG. 7 is similar to the first example 701, except that each AP may be configured to determine the normalized gain adjustment. For example, after the sounding procedure 705, the APs 102 may exchange the backoff power values 717 that each AP 102 used for the sounding procedure 705. After receiving the precoded joint transmission 730 from the central controller 455, each AP may determine the normalized gain adjustment value and apply the normalized gain adjustment to the precoded transmission. For example, at process 732, the first AP 102*a* may determine the normalized gain adjustment value based on the backoff power value that it used and the backoff power value 717 that the second AP 102*b* used. Similarly, at process 734, the second AP 102*a* may determine the normalized gain adjustment value based on the same collection of backoff power values. Because both APs 102*a-b* have been informed of the backoff power values that each used, they can come to the same calculated normalized gain adjustment value (such as using equations 1 or 2). Thus, the normalized gain adjustment value can be consistently applied by both APs 102*a-b*.

Figure 8:
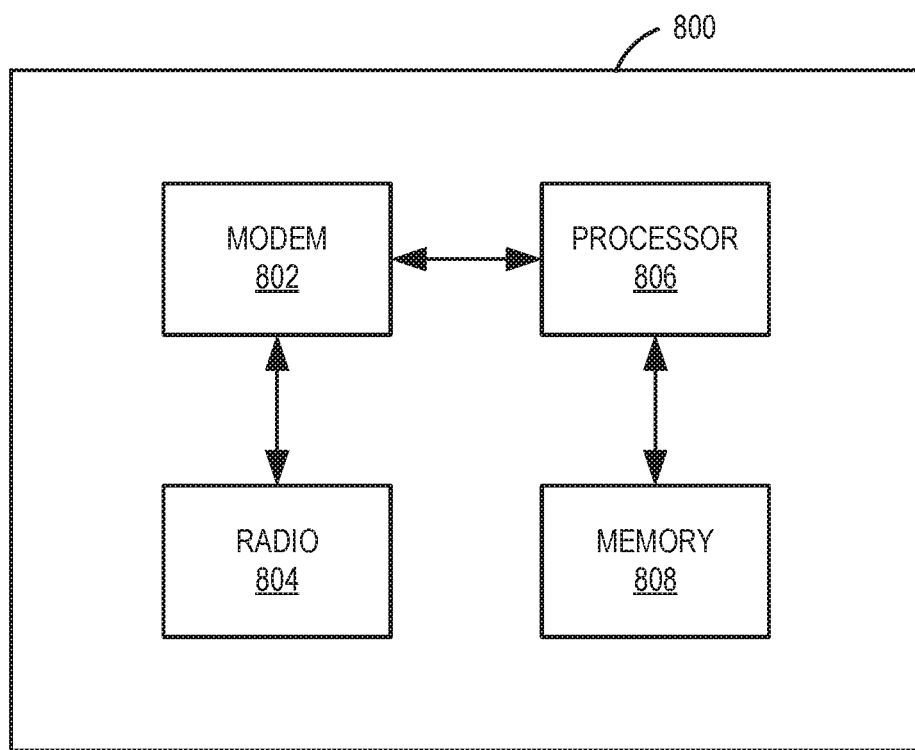
FIG. 8 shows a block diagram of an example wireless communication device.

FIG. 8 shows a block diagram of an example wireless communication device 800. In some implementations, the wireless communication device 800 can be an example of a device for use in a STA such as one of the STAs 104 described above with reference to FIG. 1. In some implementations, the wireless communication device 800 can be an example of a device for use in an AP such as the AP 102 described above with reference to FIG. 1. The wireless communication device 800 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11 ay, 802.11ax, 802.11az, 802.11ba and 802.11be.

The wireless communication device 800 can be, or can include, a chip, system on chip (SoC), chipset, package or device that includes one or more modems 802, for example, a Wi-Fi (IEEE 802.11 compliant) modem. In some implementations, the one or more modems 802 (collectively "the modem 802") additionally include a WWAN modem (for example, a 3GPP 4G LTE or 5G compliant modem). In some implementations, the wireless communication device 800 also includes one or more radios 804 (collectively "the radio 804"). In some implementations, the wireless communication device 806 further includes one or more processors, processing blocks or processing elements 806 (collectively "the processor 806") and one or more memory blocks or elements 808 (collectively "the memory 808").

The modem 802 can include an intelligent hardware block or device such as, for example, an application-specific integrated circuit (ASIC) among other possibilities. The modem 802 is generally configured to implement a PHY layer. For example, the modem 802 is configured to modulate packets and to output the modulated packets to the radio 804 for transmission over the wireless medium. The modem 802 is similarly configured to obtain modulated packets received by the radio 804 and to demodulate the packets to provide demodulated packets. In addition to a modulator and a demodulator, the modem 802 may further include digital signal processing (DSP) circuitry, automatic gain control (AGC), a coder, a decoder, a multiplexer and a demultiplexer. For example, while in a transmission mode, data obtained from the processor 806 is provided to a coder, which encodes the data to provide encoded bits. The encoded bits are mapped to points in a modulation constellation (using a selected MCS) to provide modulated symbols. The modulated symbols may be mapped to a number NSS of spatial streams or a number NSTS of space-time streams. The modulated symbols in the respective spatial or space-time streams may be multiplexed, transformed via an inverse fast Fourier transform (IFFT) block, and subsequently provided to the DSP circuitry for Tx windowing and filtering. The digital signals may be provided to a digital-to-analog converter (DAC). The resultant analog signals may be provided to a frequency upconverter, and ultimately, the radio 804. In implementations involving beamforming, the modulated symbols in the respective spatial streams are precoded via a steering matrix prior to their provision to the IFFT block.

While in a reception mode, digital signals received from the radio 804 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are fed to the demultiplexer for demultiplexing. The demultiplexed bits may be descrambled and provided to the MAC layer (the processor 806) for processing, evaluation or interpretation.

The radio 804 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 800 can include, or be coupled with, multiple transmit antennas (each with a corresponding transmit chain) and multiple receive antennas (each with a corresponding receive chain). The symbols output from the modem 802 are provided to the radio 804, which transmits the symbols via the coupled antennas. Similarly, symbols received via the antennas are obtained by the radio 804, which provides the symbols to the modem 802.

The processor 806 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 806 processes information received through the radio 804 and the modem 802, and processes information to be output through the modem 802 and the radio 804 for transmission through the wireless medium. For example, the processor 806 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques.

In some implementations, the processor 806 may generally control the modem 802 to cause the modem to perform various operations described above.

The memory 808 can include tangible storage media such as random-access memory (RAM) or read-only memory (ROM), or combinations thereof. The memory 808 also can store non-transitory processor- or computer-executable software (SW) code containing instructions that, when executed by the processor 806, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 9B:
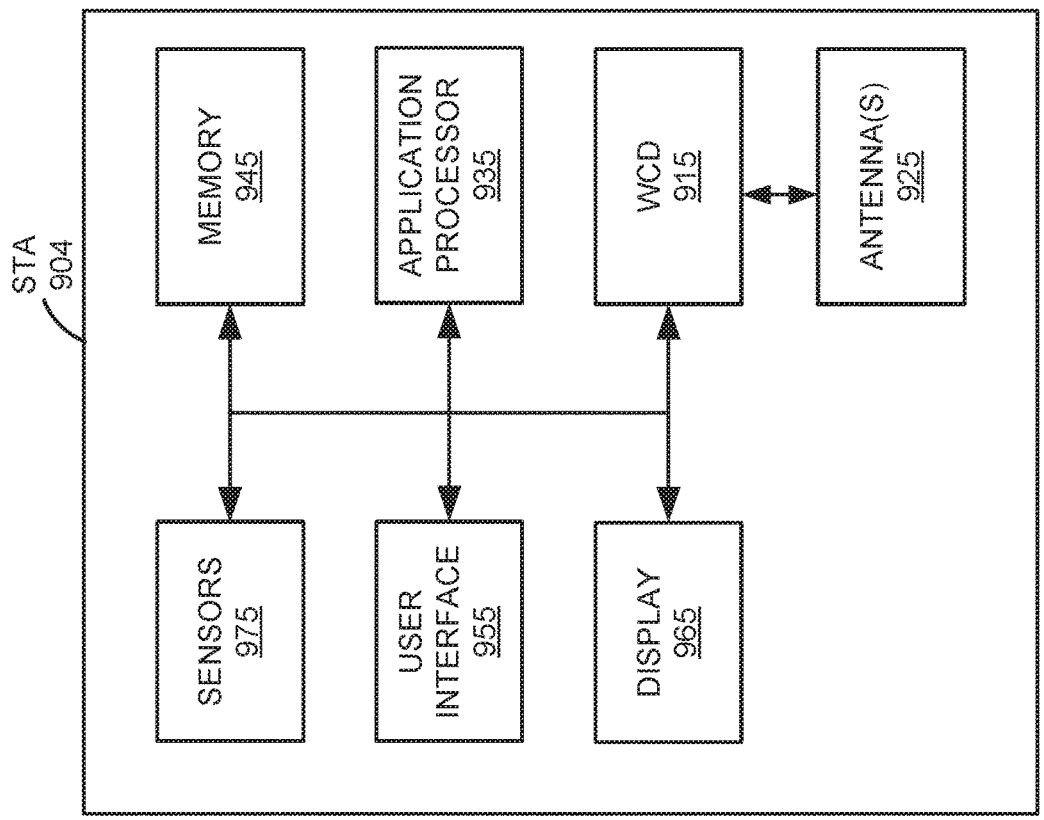
FIG. 9B shows a block diagram of an example STA.
Figure 9A:
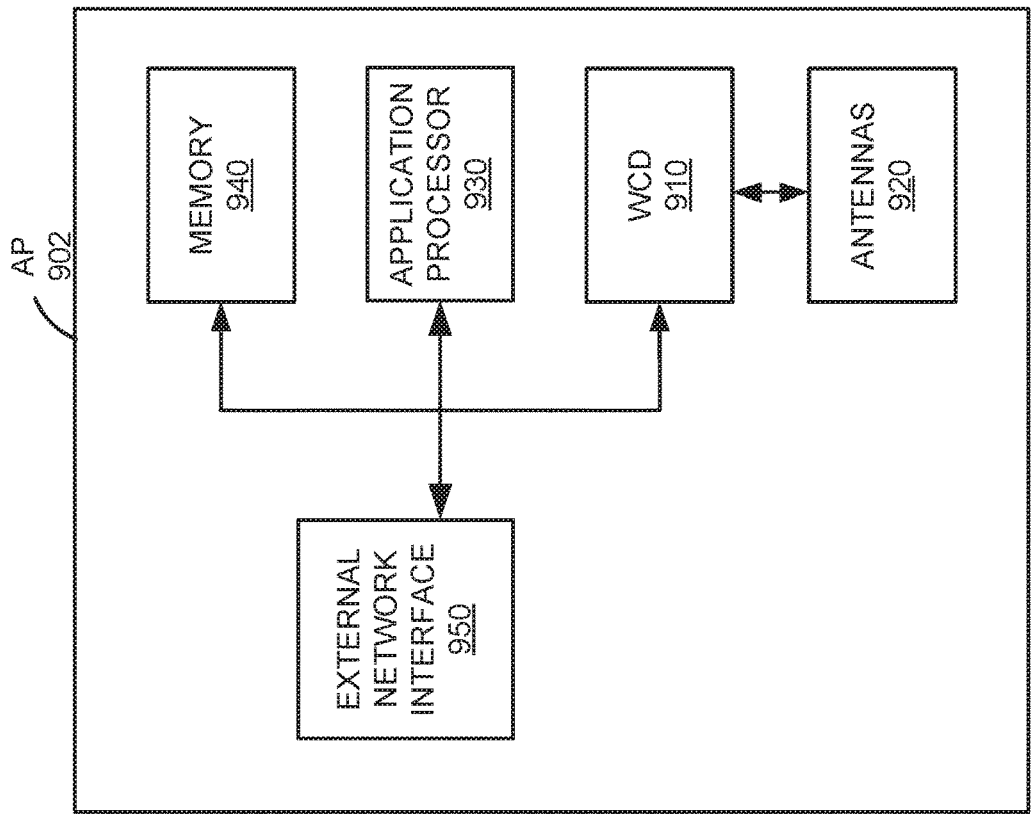
FIG. 9A shows a block diagram of an example AP.

FIG. 9A shows a block diagram of an example AP 902. For example, the AP 902 can be an example implementation of the AP 102 described with reference to FIG. 1. The AP 902 includes a wireless communication device (WCD) 910. For example, the wireless communication device 910 may be an example implementation of the wireless communication device 800 described with reference to FIG. 8. The AP 902 also includes multiple antennas 920 coupled with the wireless communication device 910 to transmit and receive wireless communications. In some implementations, the AP 902 additionally includes an application processor 930 coupled with the wireless communication device 910, and a memory 940 coupled with the application processor 930. The AP 902 further includes at least one external network interface 950 that enables the AP 902 to communicate with a core network or backhaul network to gain access to external networks including the Internet. For example, the external network interface 950 may include one or both of a wired (for example, Ethernet) network interface and a wireless network interface (such as a WWAN interface). Ones of the aforementioned components can communicate with other ones of the components directly or indirectly, over at least one bus. The AP 902 further includes a housing that encompasses the wireless communication device 910, the application processor 930, the memory 940, and at least portions of the antennas 920 and external network interface 950.

FIG. 9B shows a block diagram of an example STA 904. For example, the STA 904 can be an example implementation of the STA 104 described with reference to FIG. 1. The STA 904 includes a wireless communication device 915. For example, the wireless communication device 915 may be an example implementation of the wireless communication device 800 described with reference to FIG. 8. The STA 904 also includes one or more antennas 925 coupled with the wireless communication device 915 to transmit and receive wireless communications. The STA 904 additionally includes an application processor 935 coupled with the wireless communication device 915, and a memory 945 coupled with the application processor 935. In some implementations, the STA 904 further includes a user interface (UI) 955 (such as a touchscreen or keypad) and a display 965, which may be integrated with the UI 955 to form a touchscreen display. In some implementations, the STA 904 may further include one or more sensors 975 such as, for example, one or more inertial sensors, accelerometers, temperature sensors, pressure sensors, or altitude sensors. Ones of the aforementioned components can communicate with other ones of the components directly or indirectly, over at least one bus. The STA 904 further includes a housing that encompasses the wireless communication device 915, the application processor 935, the memory 945, and at least portions of the antennas 925, UI 955, and display 965.

As described above, disparate gain adjustments may impact the effectiveness of a joint transmission. The disparate gain adjustments may be determined by each AP differently unless there is a process by which a normalized gain adjustment can be determined.

Various implementations relate generally to the determining a normalized gain adjustment which can be applied to multiple antennas belonging to different APs that participate in a joint transmission. Some implementations more specifically relate to a network device determining the normalized gain adjustment. In some implementations, the network device may apply the normalized gain adjustment to the transmission power levels as part of a precoding process. In some implementations, the network device may collect AP gain adjustment values from the plurality of APs and send a normalized gain adjustment to the APs so that each AP can adjust the transmission power levels. Other implementations more specifically relate to communication of AP gain adjustment values determined by each AP. In some implementations, the APs communicate the AP gain adjustment values to a network device and the network device may send a highest AP gain adjustment value to the APs to be used as a normalized gain adjustment. In some implementations, that each AP can receive AP gain adjustment values from other APs and determine the normalized gain adjustment. Thus, each AP may adjust the transmission power levels based on a highest AP gain adjustment value from among the plurality of APs.

Particular implementations of the subject matter described in this disclosure can be implemented to realize one or more of the following potential advantages. In some implementations, the described techniques can be used to determine a normalized gain adjustment value that can be applied uniformly to all antennas of a collection of antennas (from different APs). A potential advantage of using a normalized gain adjustment is that the joint transmission will not suffer from a relative gain scale error that would other occur when different APs use different gain adjustment values.

Figure 10:
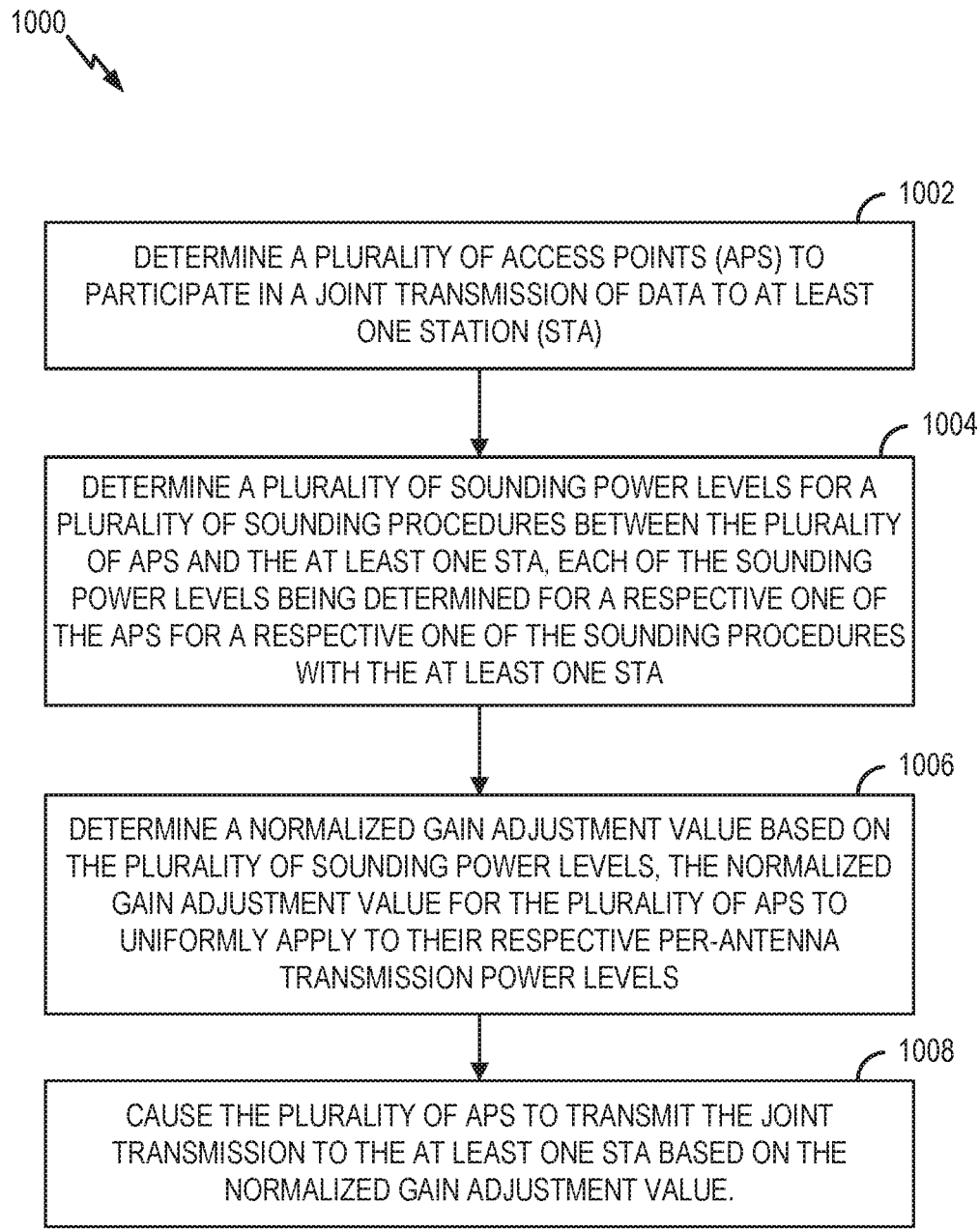
FIG. 10 shows a flowchart illustrating an example process for receiving a wireless communication according to some implementations.

FIG. 10 shows a flowchart illustrating an example process 1000 for receiving a wireless communication according to some implementations. The process 1000 may be performed by a wireless communication device such as the wireless communication device 800 described above with reference to FIG. 8. In some implementations, the process 1000 may be performed by a wireless communication device operating as or within an AP, such as one of the APs 102 and 902 described above with reference to FIGS. 1 and 9A, respectively. In some implementations, the process 1000 may be performed by a wireless communication device operating as or within a STA, such as one of the STAs 104 and 904 described above with reference to FIGS. 1 and 9B, respectively.

In some implementations, the process 1000 begins in block 1002 with determining a plurality of access points (APs) to participate in a joint transmission of data to at least one station (STA).

In block 1004, the process 1000 proceeds with determining a plurality of sounding power levels for a plurality of sounding procedures between the plurality of APs and the at least one STA, each of the sounding power levels being determined for a respective one of the APs for a respective one of the sounding procedures with the at least one STA.

In block 1006, the process 1000 proceeds with determining a normalized gain adjustment value based on the plurality of sounding power levels. The normalized gain adjustment value being for the plurality of APs to uniformly apply to their respective per-antenna transmission power levels.

In block 1008, the process 1000 proceeds with causing the plurality of APs to transmit the joint transmission to the at least one STA based on the normalized gain adjustment value.

Figure 11:
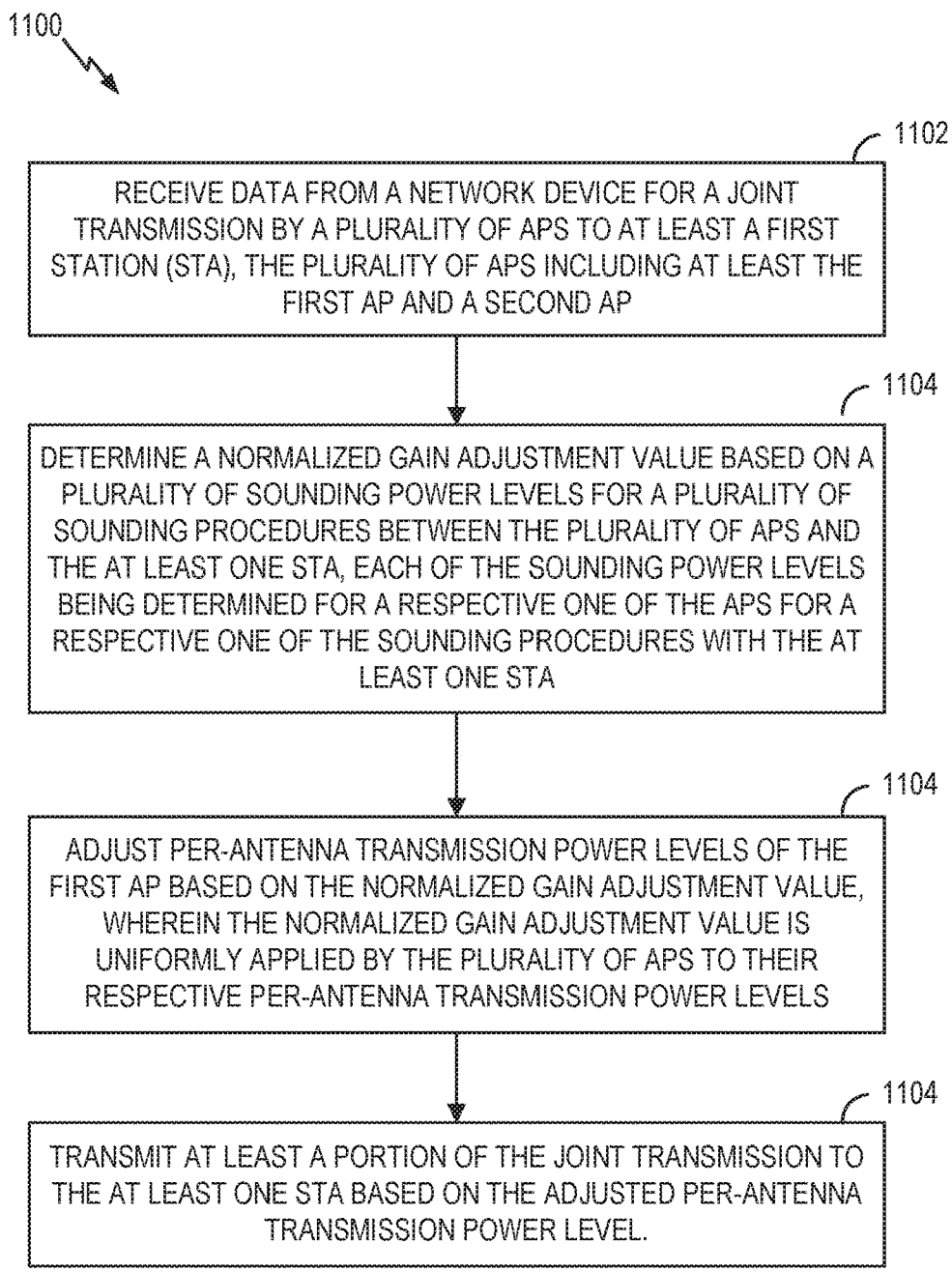
FIG. 11 shows a flowchart illustrating an example process for receiving a wireless communication according to some implementations.

FIG. 11 shows a flowchart illustrating an example process 1100 for receiving a wireless communication according to some implementations. The process 1100 may be performed by a wireless communication device such as the wireless communication device 800 described above with reference to FIG. 8. In some implementations, the process 1100 may be performed by a wireless communication device operating as or within an AP, such as one of the APs 102 and 902 described above with reference to FIGS. 1 and 9A, respectively. In some implementations, the process 1100 may be performed by a wireless communication device operating as or within a STA, such as one of the STAs 104 and 904 described above with reference to FIGS. 1 and 9B, respectively.

In some implementations, the process 1100 begins in block 1102 with receiving, by a first AP, data from a network device for a joint transmission by a plurality of APs to at least a first station (STA). The plurality of APs may include at least the first AP and a second AP.

In block 1104, the process 1100 proceeds with determining a normalized gain adjustment value, the normalized gain adjustment value based on a plurality of sounding power levels for a plurality of sounding procedures between the plurality of APs and the at least one STA. Each of the sounding power levels may be determined for a respective one of the APs for a respective one of the sounding procedures with the at least one STA.

In block 1106, the process 1100 proceeds with adjusting per-antenna transmission power levels of the first AP based on the normalized gain adjustment value. The normalized gain adjustment value may be uniformly applied by the plurality of APs to their respective per-antenna transmission power levels.

In block 1108, the process 1100 proceeds with transmitting at least a portion of the joint transmission to the at least one STA based on the adjusted per-antenna transmission power level.

Figure 12:
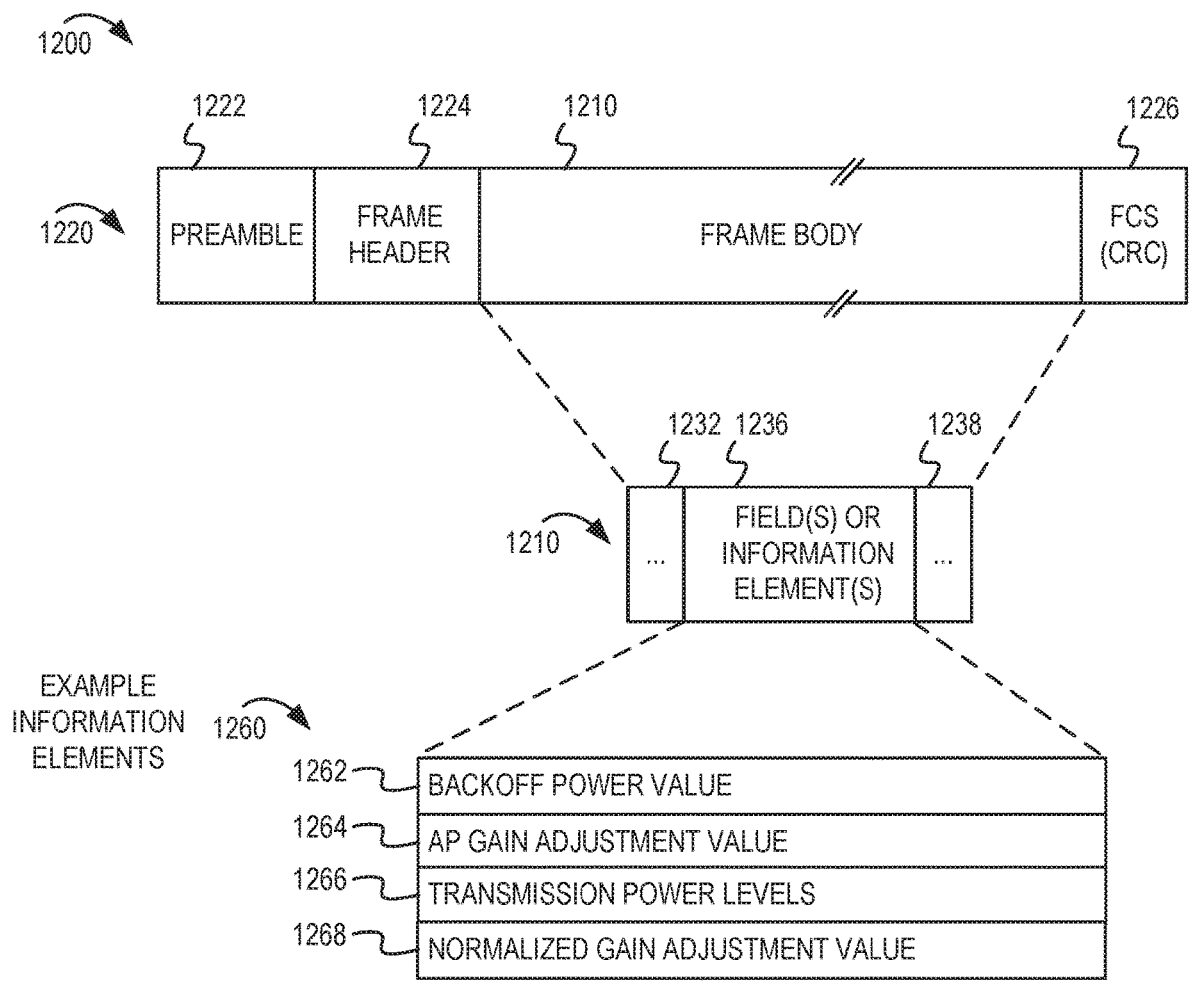
FIG. 12 depicts an example conceptual diagram of a message for sharing power parameters according to some implementations.

FIG. 12 depicts an example conceptual diagram of a message for sharing power values according to some implementations. For example, the message may be sent from the first AP to a second AP, from the second AP to the first AP, or from either of the first AP and second AP to a central controller. This message format 1200 may be used to communicate values that can be used to determine a normalized gain adjustment. FIG. 12 includes an example data frame 1220. The data frame 1220 may include a preamble 1222, a frame header 1224, a frame body 1210, and a frame check sequence (FCS) 1226. If included, the preamble 1222 may include one or more bits to establish synchronization. The preamble 1222 may be omitted in some WLANs where synchronization can be established by regular communications. The frame header 1224 may include source and destination network addresses (such as the network address of the sending AP and receiving AP, respectively), the length of data frame, or other frame control information. The frame body 1210 may be organized with a message format and may include a variety of fields or information elements 1232, 1236 and 1238.

Example information elements 1260 are shown in FIG. 12. The example information elements 1260 may include a backoff power value 1262, an AP gain adjustment value 1264, transmission power levels 1266, and normalized gain adjustment value 1268.

Figure 13:
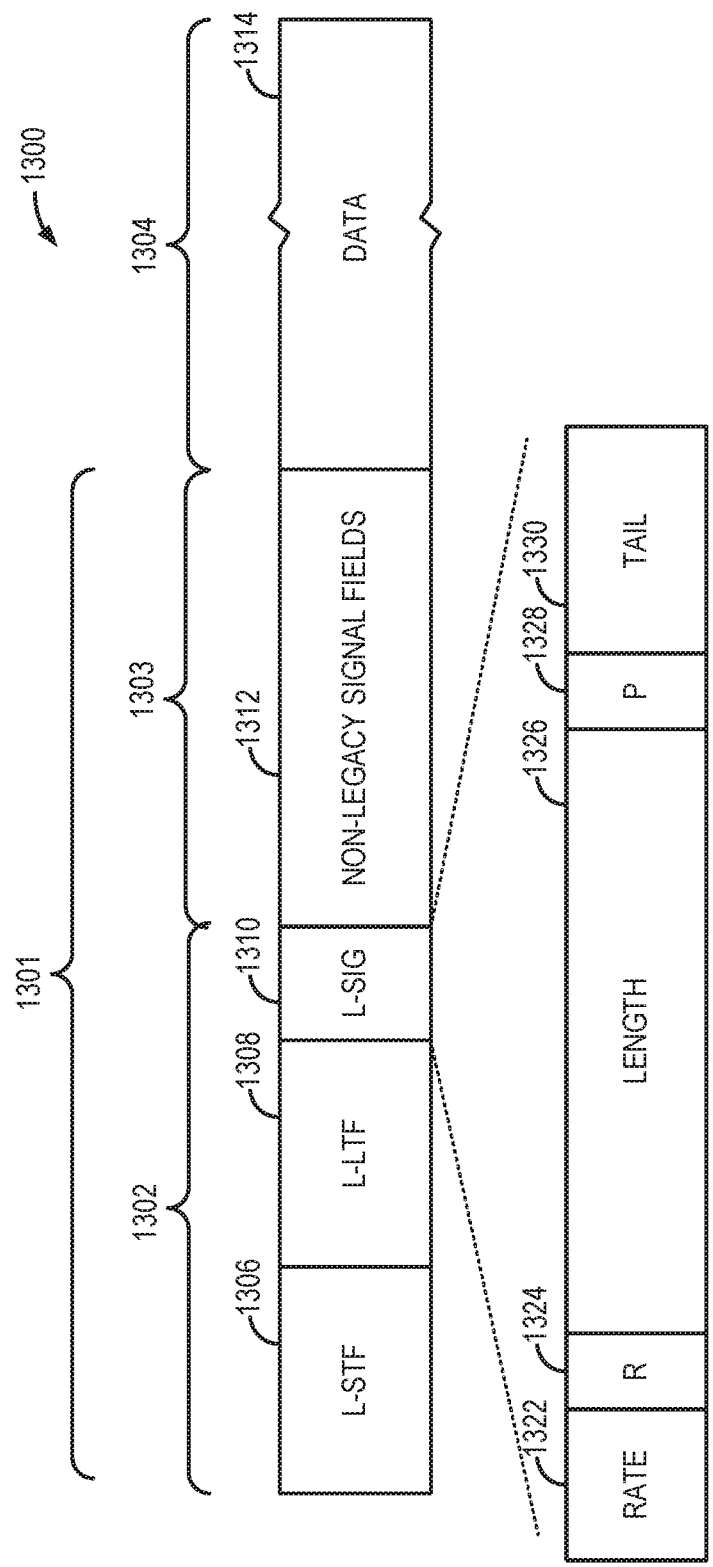
FIG. 13 shows an example protocol data unit (PDU) usable for communications between an access point (AP) and a network entity or another AP according to some implementations.

FIG. 13 shows an example protocol data unit (PDU) 1300 usable for wireless communication between an AP and a network device or another AP according to some implementations. For example, the PDU 1300 can be configured as a PPDU. As shown, the PDU 1300 includes a PHY preamble 1301 and a PHY payload 1304. For example, the preamble 1301 may include a first portion 1302 that itself includes a legacy short training field (L-STF) 1306, which may consist of two BPSK symbols, a legacy long training field (L-LTF) 1308, which may consist of two BPSK symbols, and a legacy signal field (L-SIG) 1310, which may consist of one BPSK symbol. The first portion 1302 of the preamble 1301 may be configured according to the IEEE 802.11a wireless communication protocol standard. The preamble 1301 also may include a second portion 1303 including one or more non-legacy signal fields 1312, for example, conforming to an IEEE wireless communication protocol such as the IEEE 802.11ac, 802.11ax, 802.11be or later wireless communication protocol standards.

L-STF 1306 generally enables a receiving device to perform automatic gain control (AGC) and coarse timing and frequency estimation. L-LTF 1308 generally enables a receiving device to perform fine timing and frequency estimation and also to perform an initial estimate of the wireless channel. L-SIG 1310 generally enables a receiving device to determine a duration of the PDU and to use the determined duration to avoid transmitting on top of the PDU. For example, L-STF 1306, L-LTF 1308 and L-SIG 1310 may be modulated according to a binary phase shift keying (BPSK) modulation scheme. The payload 1304 may be modulated according to a BPSK modulation scheme, a quadrature BPSK (Q-BPSK) modulation scheme, a quadrature amplitude modulation (QAM) modulation scheme, or another appropriate modulation scheme. The payload 1304 may include a PSDU including a data field (DATA) 1314 that, in turn, may carry higher layer data, for example, in the form of medium access control (MAC) protocol data units (MPDUs) or an aggregated MPDU (A-MPDU).

FIG. 13 also shows an example L-SIG 1310 in the PDU 1300. L-SIG 1310 includes a data rate field 1322, a reserved bit 1324, a length field 1326, a parity bit 1328, and a tail field 1330. The data rate field 1322 indicates a data rate (note that the data rate indicated in the data rate field 1312 may not be the actual data rate of the data carried in the payload 1304). The length field 1326 indicates a length of the packet in units of, for example, symbols or bytes. The parity bit 1328 may be used to detect bit errors. The tail field 1330 includes tail bits that may be used by the receiving device to terminate operation of a decoder (for example, a Viterbi decoder). The receiving device may utilize the data rate and the length indicated in the data rate field 1322 and the length field 1326 to determine a duration of the packet in units of, for example, microseconds (μs) or other time units.

The PDU 1300 may be used to communicate any of the example information elements described in FIG. 12, such as the backoff power value 1262, an AP gain adjustment value 1264, transmission power levels 1266, and normalized gain adjustment value 1268.

Figure 14:
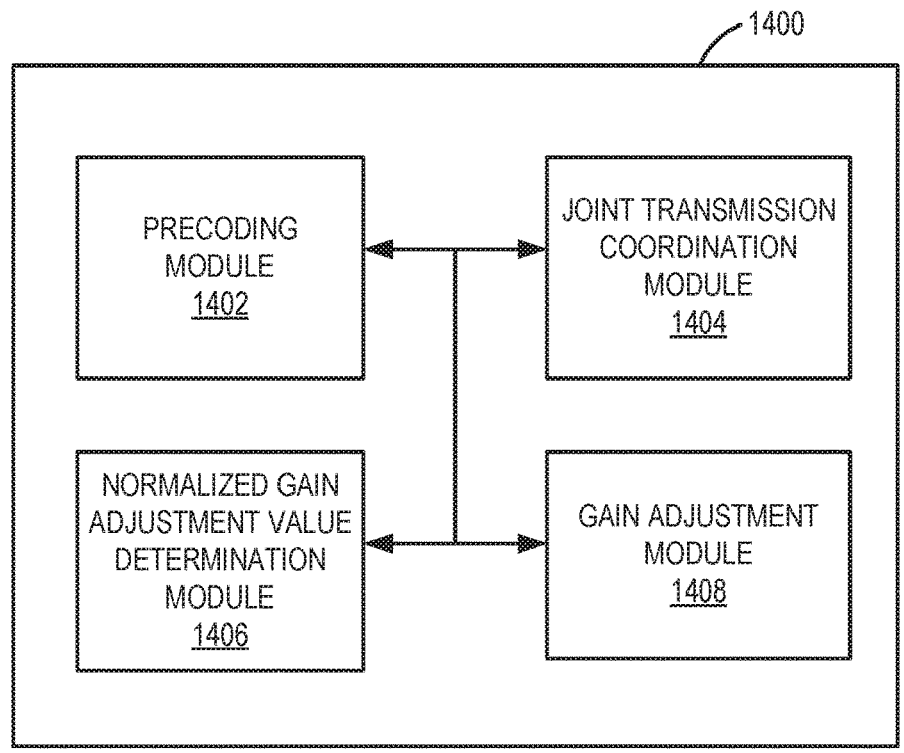
FIG. 14 shows a block diagram of an example wireless communication device according to some implementations.

FIG. 14 shows a block diagram of an example wireless communication device 1400 according to some implementations. In some implementations, the wireless communication device 1400 is configured to perform one or more of the processes described above. The wireless communication device 1400 may be an example implementation of the wireless communication device 800 described above with reference to FIG. 8. For example, the wireless communication device 1400 can be a chip, SoC, chipset, package or device that includes at least one processor and at least one modem (for example, a Wi-Fi (IEEE 802.11) modem or a cellular modem). In some implementations, the wireless communication device 1400 can be a device for use in an AP, such as one of the APs 102 and 902 described above with reference to FIGS. 1 and 9A, respectively. In some implementations, the wireless communication device 1400 can be a device for use in a STA, such as one of the STAs 104 and 904 described above with reference to FIGS. 1 and 9B, respectively. In some other implementations, the wireless communication device 1400 can be an AP or a STA that includes such a chip, SoC, chipset, package or device as well as at least one transmitter, at least one receiver, and at least one antenna.

The wireless communication device 1400 may be a network device (such as a central controller or master AP). The wireless communication device 1400 includes a demodulation module 1402, a decoding module 1404, a signaling module 1406 and a parameter configuration module 1408. Portions of one or more of the modules 1402, 1404, 1406 and 1408 may be implemented at least in part in hardware or firmware. For example, the precoding module 1402, the joint transmission coordination module 1404, the normalized gain adjustment value determination module 1406 and the gain adjustment module 1408 may be implemented at least in part by a modem (such as the modem 802). In some implementations, portions of some of the modules 1402, 1404, 1406 or 1408 may be implemented at least in part as software stored in a memory (such as the memory 808). For example, portions of one or more of the modules 1402, 1404, 1406 or 1408 can be implemented as non-transitory instructions (or "code") executable by a processor (such as the processor 806) to perform the functions or operations of the respective module.

The precoding module 1402 may be configured to generate a precoded joint transmission for transmission by a collection of antennas from multiple APs.

The joint transmission coordination module 1404 may be configured to communicate or receive information (such as a backoff power value, a sounding power level, an AP gain adjustment value, among other examples) to a network device (such as a central controller, precoding entity, master AP, or to other APs in the joint transmission system).

The normalized gain adjustment value determination module 1406 may be configured determine a normalized gain adjustment value based on the information collected by the decoding module 1404.

The gain adjustment module 1408 may be configured to apply the normalized gain adjustment to the transmission power levels for the joint transmission.

Figure 15:
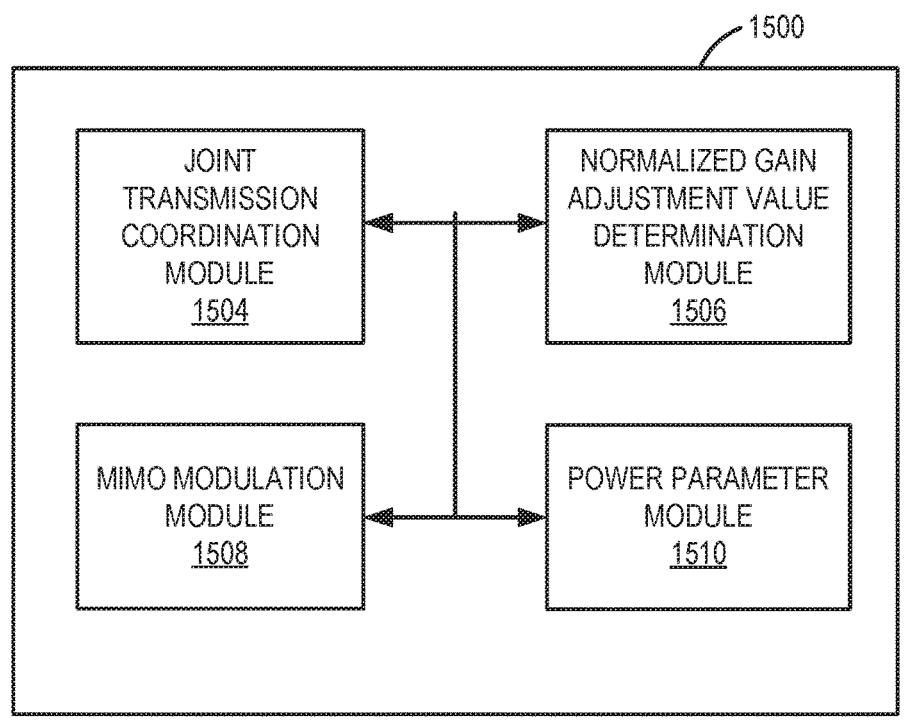
FIG. 15 shows a block diagram of an example wireless communication device according to some implementations.

FIG. 15 shows a block diagram of an example wireless communication device 1500 according to some implementations. In some implementations, the wireless communication device 1500 is configured to perform one or more of the processes described above. The wireless communication device 1500 may be an example implementation of the wireless communication device 800 described above with reference to FIG. 8. For example, the wireless communication device 1500 can be a chip, SoC, chipset, package or device that includes at least one processor and at least one modem (for example, a Wi-Fi (IEEE 802.11) modem or a cellular modem). In some implementations, the wireless communication device 1500 can be a device for use in an AP, such as one of the APs 102 and 902 described above with reference to FIGS. 1 and 9A, respectively. In some implementations, the wireless communication device 1500 can be a device for use in a STA, such as one of the STAs 104 and 904 described above with reference to FIGS. 1 and 9B, respectively. In some other implementations, the wireless communication device 1500 can be an AP or a STA that includes such a chip, SoC, chipset, package or device as well as at least one transmitter, at least one receiver, and at least one antenna.

The wireless communication device 1500 includes a joint transmission coordination module 1504, a normalized gain adjustment value determination module 1506, a MIMO modulation module 1508 and a power parameter module 1510. Portions of one or more of the modules 1504, 1506, 1508 and 1510 may be implemented at least in part in hardware or firmware. For example, the joint transmission coordination module 1504, the normalized gain adjustment value determination module 1506, the MIMO modulation 1508 and the power parameter module 1510 may be implemented at least in part by a modem (such as the modem 802). In some implementations, portions of some of the modules 1504, 1506, 1508 or 1510 may be implemented at least in part as software stored in a memory (such as the memory 808). For example, portions of one or more of the modules 1504, 1506 or 1508 can be implemented as non-transitory instructions (or "code") executable by a processor (such as the processor 806) to perform the functions or operations of the respective module.

The joint transmission coordination module 1504 may be configured to coordinate with a network device or with other APs to communicate a joint transmission to a STA.

The normalized gain adjustment value determination module 1506 may be configured determine a normalized gain adjustment value based on the information (such as a backoff power value, a sounding power level, an AP gain adjustment value, among other examples).

The MIMO modulation module 1508 may be configured to modulate the joint transmission using multiple antennas (not shown) of the wireless communication device 1500.

The power parameter module 1510 may be configured to determine a sounding power level or adjusted transmission power levels.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a network device, comprising:
   determining a plurality of access points (APs) to participate in a joint transmission of data to at least one station (STA);
   determining a plurality of sounding power levels for a plurality of sounding procedures between the plurality of APs and the at least one STA, each of the sounding power levels being determined for a respective one of the plurality of APs for a respective one of the plurality of sounding procedures with the at least one STA;
   determining a normalized gain adjustment value based on the plurality of sounding power levels, the normalized gain adjustment value for the plurality of APs to uniformly apply to their respective per-antenna transmission power levels; and
   causing the plurality of APs to transmit the joint transmission to the at least one STA based on the normalized gain adjustment value.

2. The method of claim 1, further comprising transmitting the normalized gain adjustment value to the plurality of APs.

3. The method of claim 1, further comprising:
   obtaining the data for the joint transmission;
   obtaining sounding feedback based on the plurality of sounding procedures between the plurality of APs and the at least one STA; and
   precoding the data for the joint transmission from the plurality of APs to the at least one STA based on the sounding feedback.

4. The method of claim 3, further comprising:
   selecting a plurality of antennas to participate in the joint transmission, the plurality of antennas including one or more antennas associated with each AP of the plurality of APs, wherein precoding the data includes determining beamforming information for the plurality of antennas based on the sounding feedback.

5. The method of claim 1, wherein determining the normalized gain adjustment value includes:
   determining a plurality of individual gain adjustment values, each individual gain adjustment value being associated with a respective AP of the plurality of APs; and
   determining the normalized gain adjustment value based on the plurality of individual gain adjustment values, wherein the normalized gain adjustment value is a greatest individual gain adjustment value of the plurality of individual gain adjustment values.

6. The method of claim 5, wherein determining the plurality of individual gain adjustment values comprises:
   determining a plurality of overshoot power levels for the plurality of APs, each of the overshoot power levels representing an amount of power for the joint transmission above the respective sounding power level for the respective AP;
   determining a plurality of backoff power values for the plurality of APs, respectively; and
   subtracting the plurality of backoff power values from the plurality of overshoot power levels, respectively, wherein each of the individual gain adjustment values is based on the subtraction.

7. The method of claim 6, further comprising:
   receiving the plurality of backoff power values from the plurality of APs, respectively, each of the backoff power values representing a difference between the respective sounding power level and a power limit for the respective AP.

8. The method of claim 6, further comprising:
   selecting a plurality of antennas to participate in the joint transmission, the plurality of antennas including one or more antennas associated with each AP of the plurality of APs;
   determining a plurality of per-antenna power limits based on the plurality of sounding power levels and the plurality of backoff power values, each per-antenna power limit being associated with a respective antenna of the plurality of antennas; and
   determining the normalized gain adjustment value based on the plurality of per-antenna power limits.

9. The method of claim 1, wherein the network device is or includes a first AP of the plurality of APs, and causing the plurality of APs to transmit the joint transmission includes transmitting the data to a central controller or other APs of the plurality of APs.

10. The method of claim 1, wherein causing the plurality of APs to transmit the joint transmission to the at least one STA based on the normalized gain adjustment value includes:
    selecting a plurality of antennas to participate in the joint transmission, the plurality of antennas including one or more antennas associated with each AP of the plurality of APs;
    obtaining sounding feedback based on the plurality of sounding procedures between the plurality of APs and the at least one STA;
    determining beamforming information based on the sounding feedback;

transmitting the data, the normalized gain adjustment value, and the beamforming information to a first AP of the plurality of APs; and causing the first AP to precode the data for the joint transmission to the at least one STA based on the beamforming information and the normalized gain adjustment value.

11. A method for wireless communication by a first access point (AP), the method comprising:

receiving data from a network device for a joint transmission by a plurality of APs to at least one station (STA), the plurality of APs including at least the first AP and a second AP;

determining a normalized gain adjustment value based on a plurality of sounding power levels for a plurality of sounding procedures between the plurality of APs and the at least one STA, each of the sounding power levels being determined for a respective one of the plurality of APs for a respective one of the plurality of sounding procedures with the at least one STA;

adjusting per-antenna transmission power levels of the first AP based on the normalized gain adjustment value, wherein the normalized gain adjustment value is uniformly applied by the plurality of APs to their respective per-antenna transmission power levels; and transmitting at least a portion of the joint transmission to the at least one STA based on the adjusted per-antenna transmission power levels.

12. The method of claim 11, wherein determining the normalized gain adjustment value includes receiving the normalized gain adjustment value from the network device.

13. The method of claim 11, wherein determining the normalized gain adjustment value includes:

receiving one or more sounding power levels associated with one or more other APs of the plurality of APs; and determining the normalized gain adjustment value based on a first sounding power level of the first AP and the one or more sounding power levels.

14. The method of claim 11, wherein receiving the data from the network device for the joint transmission includes receiving the data in a form of a precoded joint transmission having been precoded by the network device.

15. The method of claim 14, further comprising:

determining a sounding power level for the first AP based on a backoff power value subtracted from a power limit of the first AP;

transmitting one or more sounding transmissions having the sounding power level from one or more antennas of the first AP;

receiving sounding feedback from the at least one STA in response to the one or more sounding transmissions; and transmitting, to the network device, the sounding feedback or beamforming information based on the sounding feedback.

16. The method of claim 15, further comprising determining the backoff power value to subtract from the power limit such that the adjusted per-antenna transmission power levels will be less than a threshold value.

17. The method of claim 16, further comprising transmitting the backoff power value to the network device, wherein the normalized gain adjustment value is based on a plurality of backoff power values corresponding to the plurality of APs.

18. The method of claim 11, further comprising:

receiving beamforming information from the network device, a central controller or the second AP, the beamforming information based on sounding feedback associated with the plurality of sounding procedures; and precoding the data for the joint transmission to the at least one STA based on the beamforming information and the normalized gain adjustment value.

19. The method of claim 11, further comprising:

determining a plurality of antenna gain adjustment values, each antenna gain adjustment value based on a per-antenna power limit associated with a respective antenna of the first AP and the sounding power level for the first AP; and determining a first AP gain adjustment value based on the plurality of antenna gain adjustment values, wherein the first AP gain adjustment value is a greatest antenna gain adjustment value of the plurality of antenna gain adjustment values.

20. The method of claim 19, further comprising transmitting the first AP gain adjustment value to the network device; and receiving the normalized gain adjustment value from the network device, wherein the normalized gain adjustment value is based on a plurality of AP gain adjustment values corresponding to the plurality of APs.

21. The method of claim 19, further comprising:

receiving at least a second AP gain adjustment value from the second AP; and determining the normalized gain adjustment value based on the first AP gain adjustment value and at least the second AP gain adjustment value, wherein the normalized gain adjustment value represents a greatest AP gain adjustment value of AP gain adjustment values received from the plurality of APs.

22. A wireless communication device for managing a joint transmission from a plurality of access points (APs), comprising:

at least one modem;

at least one processor communicatively coupled with the at least one modem; and at least one memory communicatively coupled with the at least one processor and storing processor-readable code that, when executed by the at least one processor in conjunction with the at least one modem, causes the wireless communication device to:

determine the plurality of APs to participate in the joint transmission of data to at least one station (STA);

determine a plurality of sounding power levels for a plurality of sounding procedures between the plurality of APs and the at least one STA, each of the sounding power levels being determined for a respective one of the plurality of APs for a respective one of the plurality of sounding procedures with the at least one STA;

determine a normalized gain adjustment value based on the plurality of sounding power levels, the normalized gain adjustment value for the plurality of APs to uniformly apply to their respective per-antenna transmission power levels; and cause the plurality of APs to transmit the joint transmission to the at least one STA based on the normalized gain adjustment value.

23. The wireless communication device of claim 22, wherein the processor-readable code, when executed by the at least one processor, further causes the wireless communication device to:

obtain the data for the joint transmission;
select a plurality of antennas to participate in the joint transmission, the plurality of antennas including one or more antennas associated with each AP of the plurality of APs;
obtain sounding feedback based on the plurality of sounding procedures between the plurality of APs and the at least one STA;
determine beamforming information for the plurality of antennas based on the sounding feedback; and
precode the data for the joint transmission by the plurality of antennas to the at least one STA based on the beamforming information.

24. The wireless communication device of claim 22, wherein the processor-readable code, when executed by the at least one processor, further causes the wireless communication device to:
determine a plurality of individual gain adjustment values, each individual gain adjustment value being associated with a respective AP of the plurality of APs; and
determine the normalized gain adjustment value based on the plurality of individual gain adjustment values, wherein the normalized gain adjustment value is a greatest individual gain adjustment value of the plurality of individual gain adjustment values.

25. The wireless communication device of claim 24, wherein the processor-readable code, when executed by the at least one processor, further causes the wireless communication device to:
determine a plurality of overshoot power levels for the plurality of APs, each of the overshoot power levels representing an amount of power for the joint transmission above the respective sounding power level for the respective AP;
determine a plurality of backoff power values for the plurality of APs, respectively;
subtract the plurality of backoff power values from the plurality of overshoot power levels, respectively, wherein each of the individual gain adjustment values is based on the subtraction; and
determine the normalized gain adjustment value based on the plurality of individual gain adjustment values.

26. The wireless communication device of claim 25, wherein the processor-readable code, when executed by the at least one processor, further causes the wireless communication device to receive the plurality of backoff power values from the plurality of APs, respectively, each of the backoff power values representing a difference between the respective sounding power level and a power limit for the respective APs.

27. The wireless communication device of claim 22, further comprising:
at least one transceiver coupled to the at least one modem; and
a housing that encompasses the at least one modem, the at least one processor, the at least one memory, and the at least one transceiver.

28. A wireless communication device of a first access point (AP) of a plurality of access points (APs) configured to participate in a joint transmission to at least one station (STA), the wireless communication device comprising:
at least one modem;
at least one processor communicatively coupled with the at least one modem; and
at least one memory communicatively coupled with the at least one processor and storing processor-readable code that, when executed by the at least one processor in conjunction with the at least one modem, causes the wireless communication device to:
receive data from a network device, the data for the joint transmission by the plurality of APs to the at least one STA, the plurality of APs including at least the first AP and a second AP;
determine a normalized gain adjustment value, the normalized gain adjustment value based on a plurality of sounding power levels for a plurality of sounding procedures between the plurality of APs and the at least one STA, each of the sounding power levels being determined for a respective one of the plurality of APs for a respective one of the plurality of sounding procedures with the at least one STA; and
adjust per-antenna transmission power levels of the first AP based on the normalized gain adjustment value, wherein the normalized gain adjustment value is uniformly applied by the plurality of APs to their respective per-antenna transmission power levels,
wherein the at least one modem is configured to output at least a portion of the joint transmission for transmission to the at least one STA based on the adjusted per-antenna transmission power levels.

29. The wireless communication device of claim 28, wherein the processor-readable code, when executed by the at least one processor, further causes the wireless communication device to receive the normalized gain adjustment value from the network device.

30. The wireless communication device of claim 28, wherein the processor-readable code, when executed by the at least one processor, further causes the wireless communication device to receive the data in a form of a precoded joint transmission having been precoded by the network device.

* * * * *